US009436928B2

(12) United States Patent
Sabur

(10) Patent No.: US 9,436,928 B2
(45) Date of Patent: Sep. 6, 2016

(54) USER GRAPHICAL INTERFACE FOR DISPLAYING A BELONGING-RELATED STREAM

(75) Inventor: Zaheed Md Shahjahan Sabur, Adliswil (CH)

(73) Assignee: Google Inc., Mountain View, CA (US)

(*) Notice: Subject to any disclaimer, the term of this patent is extended or adjusted under 35 U.S.C. 154(b) by 466 days.

(21) Appl. No.: 13/221,772

(22) Filed: Aug. 30, 2011

(65) Prior Publication Data
US 2013/0055154 A1 Feb. 28, 2013

(51) Int. Cl.
| G06F 17/30 | (2006.01) |
| G06Q 10/10 | (2012.01) |
| G06Q 30/02 | (2012.01) |
| H04L 12/58 | (2006.01) |
| G06Q 50/00 | (2012.01) |

(52) U.S. Cl.
CPC ......... *G06Q 10/10* (2013.01); *G06F 17/30873* (2013.01); *G06Q 30/02* (2013.01); *G06Q 50/01* (2013.01); *H04L 51/32* (2013.01)

(58) Field of Classification Search
CPC .......................... H04L 51/32; G06F 17/30873
USPC ........................................................ 715/810
See application file for complete search history.

(56) References Cited

U.S. PATENT DOCUMENTS

| 6,266,649 B1 | 7/2001 | Linden et al. |
| 6,438,579 B1 | 8/2002 | Hosken |
| 7,113,917 B2 | 9/2006 | Jacobi et al. |
| 7,433,832 B1 | 10/2008 | Bezos et al. |
| 7,702,545 B1* | 4/2010 | Compton et al. ............ 705/26.9 |
| 7,761,342 B2 | 7/2010 | Calabria |
| 7,822,631 B1* | 10/2010 | Vander Mey et al. ....... 705/7.29 |
| 7,831,439 B1* | 11/2010 | Bryar et al. .................... 705/1.1 |
| 7,945,482 B2 | 5/2011 | Law et al. |
| 7,970,665 B1* | 6/2011 | Lifson .......................... 705/26.7 |
| 7,991,757 B2* | 8/2011 | Kane, Jr. ........................ 707/706 |
| 8,031,170 B2 | 10/2011 | Brown et al. |

(Continued)

FOREIGN PATENT DOCUMENTS

| WO | WO-2008/094168 A1 | 8/2008 |
| WO | WO-2010/024992 A1 | 3/2010 |

OTHER PUBLICATIONS eBay Hacks, Second Edition by David A. Karp, O'Reily Media, Inc Jun. 2, 2005 (p. 52).*

(Continued)

*Primary Examiner* — William Bashore
*Assistant Examiner* — Nathan Shrewsbury
(74) *Attorney, Agent, or Firm* — McDermott Will & Emery LLP

(57) ABSTRACT

A system and machine-implemented method for providing a user profile associated with a first user for display including a stream area displaying one or more belonging-related posts including a user link to a user associated with the post and a belonging link to a belonging associated with the post, receiving an indication of a user selection of the user link associated with a post, providing a contact profile of a user associated with the post for display upon receiving the indication of the user selection of the user link, receiving an indication of a user selection of the belonging link to the belonging associated with a post and providing a belonging profile of the belonging associated with the post for display upon receiving the indication of the user selection of the belonging link by the first user.

19 Claims, 10 Drawing Sheets

(56) References Cited

U.S. PATENT DOCUMENTS

| | | | |
|---|---|---|---|
| 8,095,432 B1 | 1/2012 | Berman et al. | |
| 8,224,773 B2* | 7/2012 | Spiegel | 707/609 |
| 8,275,674 B2* | 9/2012 | Kane et al. | 705/27.1 |
| 8,285,840 B2 | 10/2012 | Dobroth et al. | |
| 8,355,955 B1* | 1/2013 | Mirchandani et al. | 705/26.1 |
| 8,364,595 B1* | 1/2013 | Ringewald | 705/51 |
| 8,386,340 B1* | 2/2013 | Feinstein | 705/27.1 |
| 8,401,924 B1* | 3/2013 | Rajyaguru et al. | 705/26.61 |
| 8,433,620 B2 | 4/2013 | Futty et al. | |
| 8,444,048 B1* | 5/2013 | Nidamarthi et al. | 235/375 |
| 8,452,797 B1* | 5/2013 | Paleja et al. | 707/767 |
| 8,468,164 B1* | 6/2013 | Paleja et al. | 707/767 |
| 8,473,369 B2* | 6/2013 | Bradley et al. | 705/26.7 |
| 8,484,092 B1* | 7/2013 | Strand | 705/26.1 |
| 8,484,099 B1* | 7/2013 | Pope et al. | 705/26.7 |
| 8,495,197 B1* | 7/2013 | Nagargadde et al. | 709/223 |
| 8,565,810 B1 | 10/2013 | Giles et al. | |
| 8,706,566 B1 | 4/2014 | Mirchandani et al. | |
| 8,832,277 B2 | 9/2014 | Clark et al. | |
| 8,862,894 B2 | 10/2014 | Hoffman et al. | |
| 2001/0039517 A1 | 11/2001 | Kawakatsu | |
| 2002/0120506 A1* | 8/2002 | Hagen | 705/14 |
| 2003/0018777 A1 | 1/2003 | Miller et al. | |
| 2003/0233283 A1* | 12/2003 | Shah | 705/26 |
| 2005/0171863 A1* | 8/2005 | Hagen | 705/26 |
| 2005/0246221 A1 | 11/2005 | Geritz et al. | |
| 2006/0085259 A1* | 4/2006 | Nicholas et al. | 705/14 |
| 2006/0149572 A1 | 7/2006 | Auzins et al. | |
| 2006/0271460 A1 | 11/2006 | Hanif | |
| 2008/0065514 A1 | 3/2008 | Eaton | |
| 2008/0091723 A1 | 4/2008 | Zuckerberg et al. | |
| 2008/0120167 A1* | 5/2008 | Guenster et al. | 705/10 |
| 2008/0189188 A1 | 8/2008 | Morgenstern | |
| 2008/0278438 A1 | 11/2008 | Brown et al. | |
| 2009/0055285 A1 | 2/2009 | Law et al. | |
| 2009/0082111 A1 | 3/2009 | Smith et al. | |
| 2009/0177695 A1* | 7/2009 | Mahajan et al. | 707/104.1 |
| 2010/0057859 A1 | 3/2010 | Shen et al. | |
| 2010/0088180 A1 | 4/2010 | Ventilla et al. | |
| 2010/0095326 A1 | 4/2010 | Robertson, III | |
| 2010/0106730 A1* | 4/2010 | Aminian et al. | 707/748 |
| 2010/0318925 A1 | 12/2010 | Sethi et al. | |
| 2011/0072015 A1 | 3/2011 | Lin et al. | |
| 2011/0145105 A1 | 6/2011 | Law et al. | |
| 2011/0157370 A1 | 6/2011 | Livesey | |
| 2011/0166928 A1 | 7/2011 | Robinson et al. | |
| 2011/0184780 A1 | 7/2011 | Alderson et al. | |
| 2011/0191257 A1 | 8/2011 | Bernard et al. | |
| 2011/0202400 A1 | 8/2011 | Bedard et al. | |
| 2011/0202406 A1 | 8/2011 | Suomela | |
| 2011/0202429 A1 | 8/2011 | Graff et al. | |
| 2011/0202822 A1 | 8/2011 | Zuckerberg et al. | |
| 2012/0110088 A1 | 5/2012 | Su et al. | |
| 2012/0123837 A1* | 5/2012 | Wiesner | 705/14.16 |
| 2012/0150598 A1 | 6/2012 | Griggs | |
| 2012/0158539 A1* | 6/2012 | Lawrence et al. | 705/26.8 |
| 2012/0179753 A1 | 7/2012 | Welingkar et al. | |
| 2012/0254303 A1 | 10/2012 | Anbalagan et al. | |
| 2012/0304305 A1 | 11/2012 | Efraimov et al. | |
| 2013/0054365 A1 | 2/2013 | Sabur | |
| 2013/0054407 A1 | 2/2013 | Sabur | |
| 2013/0054692 A1 | 2/2013 | Sabur | |
| 2013/0054709 A1 | 2/2013 | Sabur | |
| 2013/0055056 A1 | 2/2013 | Sabur | |
| 2013/0055101 A1 | 2/2013 | Sabur | |

OTHER PUBLICATIONS

Exploring the WOW in Online-Auction Feedback by Bruce D. Weinberg et al., Science Direct Jun. 1, 2004.*

Zoninsein, "Belgium's Flair Magazine Lets Facebook Users tag Friends' Outfits, Ask Where They Got Them," AdAge Global, Apr. 6, 2011, retrieved from <http://adage.com/article/global-news/belgium-s-flair-magazine-lets-users-tag-outfits-facebook/226851/>.

* cited by examiner

USER GRAPHICAL INTERFACE FOR DISPLAYING A BELONGING-RELATED STREAM

BACKGROUND

The subject disclosure generally relates to displaying posts to a user, and, in particular, to generating a stream of posts related to belongings associated with users.

Social networking users typically share their activities and opinion related to products with their contacts on social networking sites through posts and feeds. To do so, users may create a post in text form and may share the post with their contacts.

However, these product-related posts are typically mixed in with all other posts, and social networking users have no control over only viewing posts related to specific products and/or to specific contacts and their specific products. Furthermore, because these posts are mixed in with all other posts, there is a chance that the posts may get buried and a user may not be able to view the product-related posts that may be of value to him. Thus, a more convenient way for viewing product-related posts may be desirable.

SUMMARY

The disclosed subject matter relates to a method for providing a user with a user interface displaying a belonging-related stream of belonging-related posts, the method comprising providing a user profile associated with a first user for display, the user profile comprising a stream area for displaying one or more belonging-related posts, each of the one or more belonging-related posts comprising a user link to a user associated with the post and a belonging link to a belonging associated with the post. The method further comprises, receiving an indication of a user selection of the user link to the user associated with a post of the one or more posts by the first user, and providing a contact profile of the user associated with the post of the one or more posts for display upon receiving the indication of the user selection of the user link by the first user, wherein the user associated with the post is a contact of the first user. Furthermore, the method comprises receiving an indication of a user selection of the belonging link to the belonging associated with a post of the one or more posts by the first user, and providing a belonging profile of the belonging associated with the post for display upon receiving the indication of the user selection of the belonging link by the first user.

The disclosed subject matter also relates to a system for providing a user with a user interface displaying a belonging-related stream of belonging-related posts, the system comprising one or more processors and a machine-readable medium comprising instructions stored therein, which when executed by the processors, cause the processors to perform operations comprising providing a user profile associated with a first user for display, the user profile comprising a stream area for displaying one or more belonging-related posts, each of the one or more belonging-related posts comprising a user link to a user associated with the post and a belonging link to a belonging associated with the post. The operations further comprise receiving indication of a user selection of the belonging link to the belonging associated with a post of the one or more posts by the first user, and providing a belonging profile of the belonging associated with the post for display upon receiving the indication of the user selection of the belonging link by the first user.

The disclosed subject matter further relates to a machine-readable medium comprising instructions stored therein, which when executed by a machine, cause the machine to perform operations comprising providing a user profile associated with a first user of one or more users of a system for display, the system maintaining a social graph of belongings, wherein the social graph of belongings comprises the one or more users, each of the one or more users associated with one or more belongings, the user profile comprising a stream area for displaying one or more belonging-related posts, each of the one or more belonging-related posts comprising a user link to a user associated with the post and a belonging link to a belonging associated with the post, wherein the user associated with the post is a user of the one or more users and wherein the belonging associated with the posts is a belonging of the one or more belongings. The user profile further comprises a belonging area for displaying the one or more belongings of the first user within the social graph of belongings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
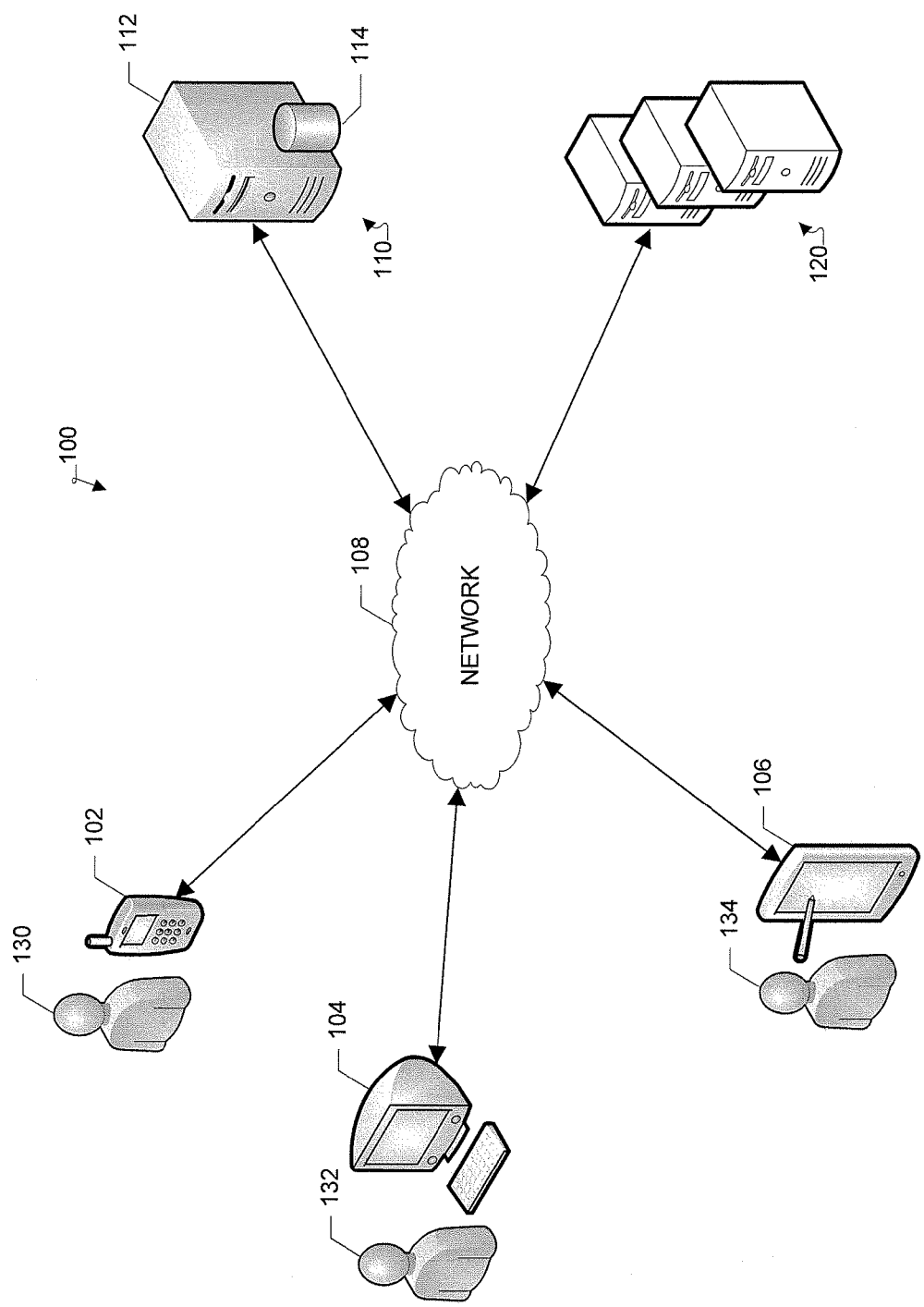
FIG. 1 illustrates an example client-server network environment which provides for displaying a belonging-related stream using a social graph of belongings.

As used herein, "belongings" refer to items owned by a user or items a user has indicated that the user is looking to own, borrow or learn more about. A user's belongings may include items purchased online (e.g., through an internet based retailer), offline (e.g., at regular retail stores), or received as gifts. In accordance with the subject disclosure, a method and a system are provided for building a social graph of belongings of one or more users and providing each of the one or more users of the system with a belonging-related stream. In one instance, each user of the system may add one or more belongings, and the system may associate each of the belongings with the user. Thus, in one example of the subject disclosure, a social graph of belongings may include associations between a user and their belongings. In one example, the social graph of belongings may further include associations between users (e.g., by leveraging existing social graphs at one or more remote social networking sites). An exemplary social graph of belongings is described in further detail below with respect to FIG. 9.

In one example, the system may allow users of the system to share activities related to their belonging with their contacts. As used herein, "posts" generally refer to any displayable notification or announcement regarding activities performed with respect to a belonging, including for example comments, replies, announcements, status updates, digital photos, videos or other appropriate electronic information. Activities related to belongings may include adding a belonging, adding reviews regarding a belonging, adding a description regarding the belonging, modifying one or more attributes of a belonging, sharing the belonging, or indicating a state for the belonging.

Users of remote social networking sites may create associations with one another. These associations may be stored within a social graph at each remote social networking site (e.g., maintained at a remote server). Such user associations may be defined on a user-to-user basis, or as a group of users associated through membership within a group. As used herein, "contacts" refer to a user's friends, social circles, groups and other users that the user is associated with, at one or more remote social networking sites.

As used herein, "social circles" are categories to which a user can assign their social networking contacts and better control the distribution and visibility of social networking messages. In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers and family, and there may be some overlap among those groups (e.g., a coworker who is also considered to be a friend, a family member who is also a coworker). Through the creation and use of social circles, the user can organize and categorize social networking contacts into various different groupings.

The system may leverage existing social graphs maintained at one or more remote social networking sites to facilitate distribution of posts with contacts of a user. For example, one or more remote social networking sites may maintain a social graph of users and their contacts. The system may access social graphs maintained at these remote social networking sites and retrieve contacts of the users of the system. In one instance, the user may indicate membership at one or more remote social networking sites and provide the system with access to these remote social networking sites, for example, through a token. The contacts retrieved by the system may depend upon the specific privacy settings enforced at each of the remote social networking sites.

The system may, upon accessing the remote social networking sites, retrieve information with respect to one or more users of the system and their associated contacts. Using the retrieved contacts, the system can then allow users of the system to share posts related to their belongings with their contacts. The post may then be distributed to the one or more remote social networking sites to be displayed to the user's contacts at the remote social networking site. The system may allow the user to choose specific contacts or groups of contacts at the one or more remote social networking sites with whom the post is shared. In one example, some or all of the remote social networking sites may provide support for selectively sharing posts with one or more contacts of the users.

The system may further provide for tracking the shared posts. In one example, prior to the post being distributed to the one or more remote social networking sites, each post may be assigned a unique identifier to facilitate tracking and control of the post once the post has been distributed either locally or to one or more remote social networking sites. The unique identifier may be associated with a belonging the post is related to and/or a user associated with the specific belonging. In one exemplary instance, the system tracks the post through the unique identifier. For example, the post may be linked with the unique identifier such that after distribution the post may be retrieved and modified using the link, even after the post has be distributed and displayed to contacts.

Additionally, the system may allow users of the system to borrow or lend belongings to one or more other users of the system. For example, a first user may request to try out a belonging of a contact owning the belonging (e.g., to further help the user in making a decision regarding purchasing the item corresponding to the belonging). For example, a user may generate a request, post or comment, displayed to one or more contacts, to borrow an item corresponding to a belonging owned by one or more contacts or specifically a belonging of a contact. The system may further allow users to keep track of items they have borrowed as well as items they have lent to other users of the system.

Once a belonging is lent to the user, the contact may modify the state of the belonging (e.g., by interacting with a graphical user interface of the system displaying a belonging profile), or reorganize the belonging within a specific belonging category, to indicate that the item has been lent, and may further indicate that the item has been lent to the user. The system may then modify the state of the belonging within the social graph of belongings and may further store the information regarding the user the item has been lent to.

The system may further create a new association between the user and the belonging lent to the user within the social graph of belongings. The belonging may then be indicated as being borrowed in the user's belongings, and may further include information regarding the owner of the belonging (e.g., contact of the user). Thus, both the user and his/her contact may keep track of the belonging having been lent to the user. In response to the borrowing/lending of belonging the system may detect a belonging related activity and may generate a post to be distributed to one or more contacts of the user, and/or contact of the user owning the belonging.

Furthermore, a user of the system may add a belonging to his/her profile and may indicate the belonging as an item the user wishes to purchase, own or borrow (hereinafter referred to as a "wish list belonging"). As used herein, a "wish list belonging" may refer to a belonging which a user may wish to own, purchase, borrow, and/or learn more about. For example, such belongings may be included within the social graph of belongings associated with the user. The wish list belongings may be assigned to a belonging category dedicated to belongings the user may not own but may wish to own, purchase, or borrow, and/or belongings the user may be generally interested in purchasing. For example, in one aspect, the user may add a belonging and may add the belonging to a category indicated for wish list belongings of the user. In another example, the user may assign a state to each belonging when the belonging is being added. The state of a belonging may be indicated as wish to purchase, wish to borrow, wish to own or wish to learn more about. In one aspect, contacts of the user may view the belongings indicated as a wish list belonging and may provide comments and feedback regarding the belonging, and may further offer to lend the belonging to the user. The user may further be provided with a list of contacts owning a belonging corresponding to the wish list belonging, and may request to borrow the belonging (e.g., by creating and distributing a post).

In one aspect, when adding a belonging (e.g., a wish list belonging), the user may enter a name of a belonging or other indication of a belonging name or identification. The system may then determine a full name or identifier of the item associated with the belonging and may associate the belonging with the item corresponding to the belonging. Thus, each belonging within the social graph of belongings corresponds to an item, and therefore while each belonging is unique and customized to the user associated with the belonging, one or more belongings may correspond to the same or similar item. In this manner, the belongings of the user may be more accurately stored using actual product names. The user may alternatively be presented with specific queries regarding the entered product such as serial number information, product version, product name, product developer and other product specific information, to determine the actual item associated with the belonging being inputted by the user. When a user wishes to borrow an item or try out the item (e.g., a wish list belonging or item the user wishes to purchase), the system may identify one or more belongings within the social graph of belongings corresponding to the same item and may present the belongings to the user. The system may further only present the belongings identified and owned by a contact of the user or shared with the user, such that the user may request to borrow the belonging. The system may then keep track of whether a contact of the user lends the belonging to the user and may keep track of the item being lent to the user.

The posts shared with contacts of the user may then be collected and stored within a database of belonging-related posts maintained by the system. Upon receiving a request from a user of the system, the one or more posts may be retrieved and displayed to the user within a belonging-related stream. As used herein, the belonging-related stream refers to a stream of one or more posts specifically related to belongings maintained within the social graph of belongings. The system may determine those posts at the social networking sites which have been shared with the user, and specifically directed to belongings maintained within the social graph, and may retrieve and display those posts to the user, such that the user is able to view all belonging-related posts within a single stream.

FIG. 1 illustrates an example client-server network environment, which provides for managing belonging-related information using a social graph of belongings. A network environment 100 includes a number of electronic devices 102-106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example embodiments, electronic devices 102-106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In one embodiment, server 110 includes a processing device 112 and a data store 114. Processing device 112 executes computer instructions stored in data store 114, for example, to facilitate managing belonging-related information associated with users interacting with electronic devices 102-106. Server 110 may further be in communication with remote servers 120 either through the network 108 or through another network or communication means.

According to some aspects, remote servers 120 can be any system or device having a processor, a memory and communications capability for hosting various remote social networking sites. In one embodiment, remote servers 120 may be further capable of maintaining social graphs of users and their contacts. The remote social networking sites hosted on the remote server 120 may enable users to create a profile and associate themselves with other users at a remote social networking site. The remote servers 120 may further facilitate the generation and maintenance of a social graph including the user created associations. The social graphs may include, for example, a list of all users of the remote social networking site and their associations with other users of a remote social networking site.

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. Communications between the client devices 102-106, server 110 and/or one or more remote servers 120 may be facilitated through the HTTP communication protocol. Other communication protocols may also be facilitated including for example, XMPP communication, for some or all communications between the client devices 102-106, server 110 and one or more remote servers 120.

Users 130-134 may interact with the system hosted by server 110, and/or one or more social networking sites hosted by remote servers 120, through a client application installed at the electronic devices 102-106. Alternatively, the user may interact with the system and the one or more remote social networking sites through a web based browser application at the electronic devices 102-106. Communication between electronic devices 102-106 and the system, and/or one or more remote social networking sites, may be facilitated through a network (e.g., network 108).

In one embodiment, users 130-134 may interact with the system maintaining a social graph of belongings, which is hosted at the server 110, to manage their belongings. Users 130-134 operating electronic devices 102-106 can manage their belongings, share their belonging-related activities with contacts and control track and modify their posts (e.g., using server 110). For example, users 130-132 may access the system and may create a user profile including a user belonging profile.

In one aspect, upon receiving a user request to interact with the system at a client device (e.g., electronic devices 102-106), the client device may initiate a communication with the system and send a data set including login information of the user. The data set can be transmitted from the user's client device (e.g., electronic devices 102-106) and received at server 110 hosting the system, for user authentication. Once the user is authenticated and access is granted to the user, the system may retrieve and send a data set to the user's client device, for displaying a graphical user interface at the client device operated by the user (e.g., electronic devices 102-106).

The system may further send a query to the user's client device (e.g., displayed within the graphical user interface displayed at the client device) for information regarding one or more social networking sites the user is associated with. Upon receiving a response from the user's client device (e.g., in response to a selection by the user operating the device) the system may initiate establishing communication with one or more remote social networking sites (e.g., through network 108 and remote servers 120). For example, the system may cause the client device to reroute the user to the social networking site. The user's client device may then communicate with the social networking site and send login information to the social networking site, for example by sending a data set including the login information. The social networking site may authenticate the user using the received data set and may provide the user's client device with a token (e.g., a temporary token). The system hosted at server 110 may then retrieve the token from the user's client device, and may establish communication with one or more servers 120 hosting the remote social networking site using the token. For example, the communication may be facilitated using API calls. Similar steps may be performed for each of the one or more social networking sites associated with the user operating the client device.

Upon being granted access to each of the one or more social networking sites (e.g., through one or more remote servers 120), the system may then issue a request to each remote social networking site associated with the user to retrieve all contacts of the user. In one embodiment, for example, the system (e.g., through server 110) may issue an API call sent to the social networking site (e.g., sent from server 100 to one or more remote servers 120 through network 108). In one aspect, a remote social networking site hosted by one or more remote servers 120, may maintain a social graph comprising all contacts of each of its members, including the user. The social graph may be stored at the storage at the one or more remote servers 120 or may be stored remotely and the one or more remote servers 120 may access the remote storage and retrieve such information. The social networking site may access the social graph and may retrieve the contacts of the user. The social networking site may further retrieve information associated with each contact or the association of the user with the contact, such as privacy preferences. The one or more remote servers 120 hosting the social networking site may provide the system (e.g., through server 110) with data sets including the contacts of the user, and may do so based upon contact information such as the privacy preferences. The server 110, upon receiving the contact information from one or more remote social networking sites, may store the data set including the contact information for each user (e.g., within the belonging profile of the belonging) at the server 110 (e.g., at storage 114). In one aspect, the contact information maintained at the server 110 may be updated periodically, by issuing a request to the one or more remote social networking sites (e.g., through one or more remote servers 120) and receiving updated data sets including user contact information.

The system may then provide the user's client device with an updated graphical user interface including the retrieved contacts of the user. Users 130-132 may interact with the graphical user interface provided by the system and displayed at the user's client device to add one or more belongings to their user belonging profile. Each user may further enter belonging attributes regarding their belongings, such as a belonging name, a belonging image, a description and review regarding the belonging. Additionally, purchase information regarding a belonging may further be entered by a user of the system for each of the user's belongings. For example, information such as purchase receipts, warranty information and other such information may be inputted by the user and may be maintained at the system. Still further, a user may assign a state for each of his/her belonging maintained within the social graph of belongings. A "belonging state" as used herein may refer to a status of the belonging. Belonging states may include, for example, the belonging being owned, borrowed, for sale, reviewed, given away, lent, or being a belonging the user wishes to buy, borrow or own. Each user may additionally organize their belongings into different belonging categories, and may further select contacts with whom activities regarding the newly added belonging may be shared. The entered information may then be sent from the user's client device, as a data set, to the system (e.g., through server 110) and may be stored at the server (e.g., at storage 114). The system (e.g., through server 110) may use the received information within the data set and may update the social graph of belongings maintained at the system (e.g., through server 110).

In addition to receiving belonging information, the system may further receive requests from the user's client device when the user wishes to share activities related to their belongings with contacts. Upon detecting a belonging-related activity performed by the user or upon a request from the user's client device to the system, the system may generate a post related to a belonging. Upon generating the post, the system may issue requests (e.g., API calls) to one or more remote social networking sites to display the post to selected contacts of the user at the one or more remote social networking sites. A data set including the post may be sent to the one or more social networking sites. The social networking site may then use the information included within the data set to display the post at the remote social networking site. Thus, the system may provide a platform where users can organize and share their belongings in a centralized and more effective way.

The system may further detect requests from the user's client device, e.g., through a selection of the user at a graphical user interface presented at the client device to view a belonging-related stream including posts related to belongings of the social graph of belongings. In one aspect, upon receiving the request, the system accesses a database and retrieves a dataset of one or more posts and sends the dataset to the user's client device. The graphical user interface of the user's client device may then be updated to display the belonging-related stream provided within the dataset sent from the system.

The system may provide users with the ability to easily share information about their belongings, know and control what is shared and with whom, preserve valuable information about their belongings, organize all the information shared regarding their belonging, including reviews and comments in one place, share their wishes to borrow or buy an item with their contacts, seek recommendations from their contacts, sell, buy, give away, borrow and led their belongings, and search and browse belongings of their contacts.

While each of the users 130-134 may interact with the system through their respective client device 102-106, for exemplary purposes the interactions between the users and the system is hereinafter described with reference to user 130. In many instances, each user 130-134 may interact with the system in the same or similar manner described below with respect to user 130.

User 130 interacting with electronic device 102 may register with the system hosted by server 110 and create a user profile. In one embodiment, upon registration, user 130 may access the system and add one or more belongings. User 130 may further share activities performed with respect to those belongings with his/her contacts on one or more remote social networking sites directly through the system hosted by server 110.

User 130 may interact with the system by logging into the system using pre-stored login information (e.g., a user name and password). If user 130 is a first time user, user 130 may register with the system and create login information (e.g., a user name and password) to be used for subsequent access to the system. Once in the system, user 130 may be presented with a graphical user interface displaying a user profile associated with user 130 (e.g., user profile 250 illustrated in FIGS. 2 and 3 described in further detail below). In another embodiment, the user may request to access his/her user profile, and upon receiving the request, the system may provide user 130 with a graphical user interface including a user profile 250 as shown in FIGS. 2 and 3.

Figure 2:
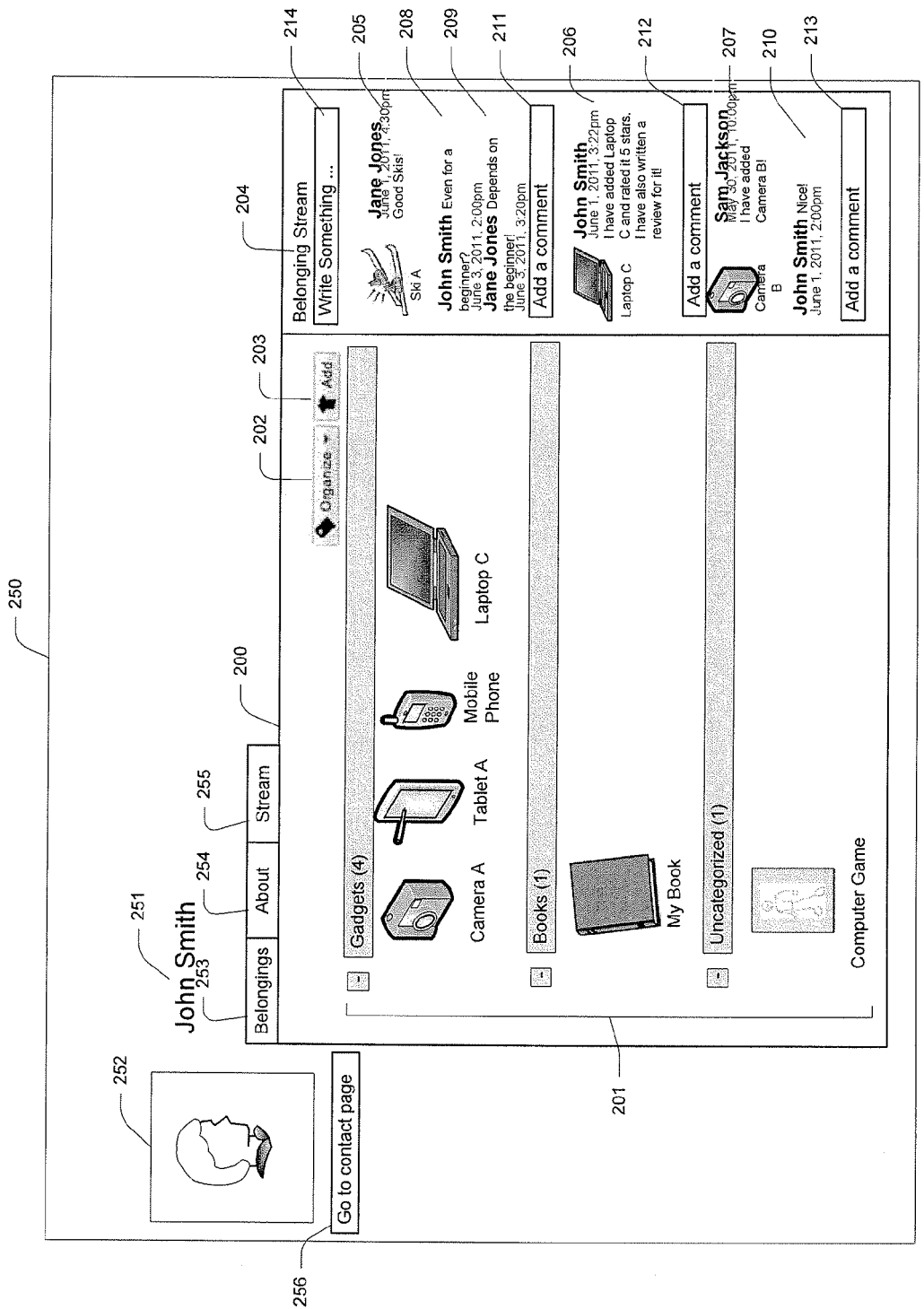
FIG. 2 illustrates a screen-shot of an example graphical user interface for viewing and managing a user profile and a user belonging profile of a user of a system maintaining a social graph of belongings.
Figure 3:
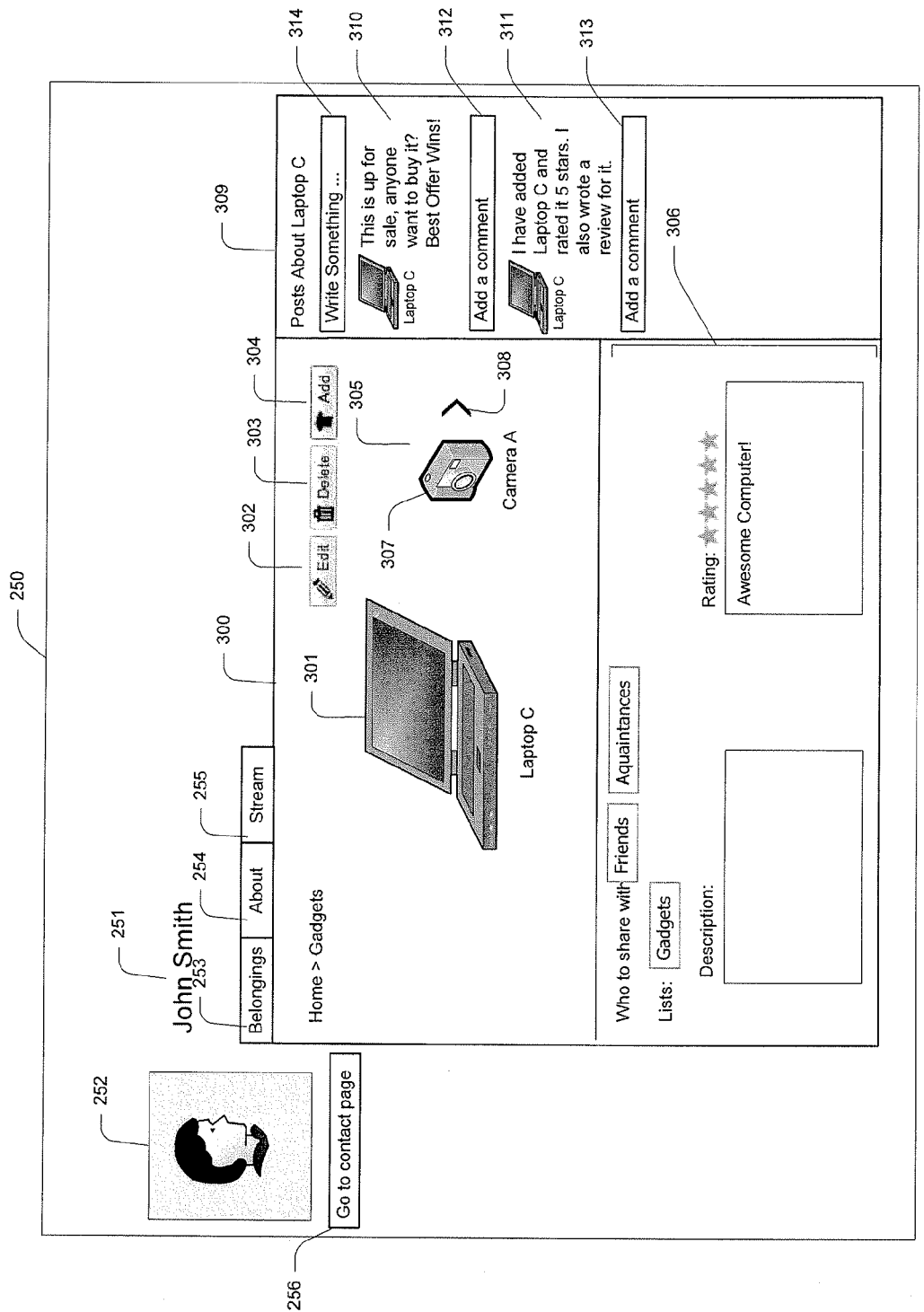
FIG. 3 illustrates a screen-shot of an example graphical user interface for viewing and managing a belonging profile of a belonging within a social graph of belongings.

FIG. 2 illustrates a screen-shot of an example graphical user interface for viewing and managing a user profile and a user belonging profile of a user of the system maintaining a social graph of belongings. The user profile 250 may include general information regarding user 130, including the name of user 130 (e.g., item 251) and an image of the user 130 (e.g., item 252). Furthermore, a contact entry box 256 may be provided to allow the user to enter names of contacts. Upon entering a contact name, the user may then be able to navigate to the belonging profile of a contact and may be able to browse the belongings of the contact. The user profile may also include multiple tabs, such as a "belongings" tab 253, an "about" tab 254 and a "stream" tab 255. The about tab 254 may include basic information regarding user 130 such as a list of contacts, an email address, and other such information. In one instance, such information may be entered by the user upon registering with the system. The user information may be stored within a user profile.

The stream tab 255 may display a belonging-related stream of posts related to belongings and associated with user 130 (e.g., streams similar to those displayed within the stream section 204 and stream section 309). In one embodiment, the one or more posts include posts related to belongings of other users of the system and shared with user 130 by other users of the system (e.g., users 132 and 134), or posts of user 130 (e.g., posts generated in response to adding a belonging or performing some other activity with relation to a belonging). Stream tab 255 may display the posts in a sorted list. The posts may be sorted according to date and time, or according to other criteria specified by user 130.

The posts presented within the stream tab 255 may include user-generated posts entered through the system (e.g., through a web interface or through a client application installed at the client device of the user). Additionally, users of the system may also create belonging-related posts through interaction with the system through a remote social networking site. For example, a client application in communication with the system may be integrated into one or more social networking sites and the user may create posts regarding belongings at the remote social networking site. The posts presented in the belonging-related stream may further include posts automatically generated by the system, for example upon detecting a belonging-related activity of a user (e.g., user 130).

Upon detecting the presence of user 130, either when the user 130 logs into the system or when user 130 requests to access his/her user profile, the system may access all belonging-related posts and may identify those associated with user 130. In one embodiment, the system may maintain a database of all belonging-related posts concerning belongings of the social graph of belongings, including for example those created within the system or through a remote social networking site integrated with the system. Posts associated with user 130 may include posts relating to the belongings of user 130, including posts created by user 130, posts generated by the system in response to belonging-related activities of user 130, as well as posts shared with user 130 by other users of the system (e.g., users 132 and 134). The system may identify and retrieve these posts and select one or more of the retrieved posts to generate a belonging-related stream for the user. The belonging-related stream may then be displayed within the stream tab 255. The retrieved posts may further be sorted before a number of the retrieved posts are selected to be displayed within the belonging-related stream. For example, retrieved posts may be sorted according to a date and time of the post (e.g., the time and date the post was created, generated or stored). Once the posts have been sorted, the system may then selected a selected number of the posts ranked highest within the list of retrieved posts and may display the selected number of posts as the belonging-related stream. The process of providing a user with a belonging-related stream is further described below with respect to FIGS. 5 and 6.

The belonging-related stream displayed within the stream tab 255 may further include comments relating to one or more of the displayed posts. Comments associated with the posts being displayed and with user 130 (e.g., shared with or entered by user 130) may be displayed within the belonging-related stream displayed within the stream tab 255. The posts displayed within the stream tab 255 may be sorted according to the date and time of the comments associated with each of the one or more posts.

Further, each displayed post may be displayed along with a comment entry box allowing user 130 to add a comment regarding the respective post. User 130 may enter text corresponding to a comment regarding a belonging-related posts displayed within the belonging-related stream and upon completion may select to share the comment with one or more contacts with whom the posts associated with the comment may be shared. The system may detect the new comment and may begin the process of distributing the comment to one or more other contacts viewing the post at one or more remote social networking sites. In one embodiment, the comment may be distributed according to pre-stored belonging attributes of the specific belonging the post is in regards to. Further, comments may be associated with their respective posts and stored within a database maintained by the system (e.g., the database storing the posts). A time and date of creation of the comment may further be stored within the database.

A post entry box may further be displayed within the stream tab 250 to allow user 130 to enter a new post regarding the belongings of the user (e.g., belongings of user illustrated in the belonging section 201). User 130 may enter text corresponding to a post regarding a belonging and upon completion may select to share the post with selected contacts. The system may detect that a new post regarding the belonging has been added. The system may then generate a post and may begin the process of distributing the post to the selected contacts of user 130 at one or more remote social networking sites. In one embodiment, the post may be distributed according to pre-stored belonging attributes of the specific belonging the post is in regards to. Further, the text is stored within a database of posts, including the list of contacts with which the post is shared. The post may further be stored within a database maintained by the system. A date and time associated with the posts (e.g., the time the post was created, generated or stored) may be stored with the post. The post may then be detected by the system as a new post associated with user 130 and may be displayed within the stream tab 250.

Each belonging-related post may include a link associated with the user creating the post and a link associated with the belonging the post is related to. The links may be embedded within the post, including the text and/or the image associated with the post. The links may be selectable by user 130 and upon selection may direct the user to a profile related to the link. For example, a link to each user provides access to the belonging profile of the user, while the link to a belonging provides access to the belonging profile of the belonging.

For example, each post may include the name of the user associated with the post. The link to the user may be embedded within the displayed name. User 130 may select the link to view a user belonging profile or contact belonging profile of the user associated with the post, which may be a contact of user 130. The selection of the link may result in the system accessing and displaying the belonging profile of the user associated with the displayed post.

Each post comment may further include a link to the belonging the post is associated with. The link may be embedded within the post, including for example within the image included with the post and/or within the text of the post. For example, where the text of the post includes the name of the belonging, a link may be embedded within the belonging name. The link may alternatively or additionally be embedded within the image displayed along with each post. User 130 may select the link to view a belonging profile associated with the belonging, which may be a belonging of user 130 or a belonging of another user of the system, for example a contact of user 130. The selection of the link may result in the system accessing and displaying the belonging profile of the belonging to user 130.

Furthermore, comments may further include a link (e.g., a link to the user associated with the comment). The link may be embedded within the comment. For example, the comment may be displayed along with the name of the user who entered the comment and a link may be embedded within the name of the user. The selection of the link may result in the system accessing and displaying the belonging profile of the user associated with the displayed post. An example of a belonging profile of a contact of user 130 is illustrated below in the graphical user interface of FIG. 4, which will be described in further detail below.

The belongings tab 253 may provide the user with one or more graphical user interfaces enabling the user to interact with the system to view and manager his/her belongings and share belonging-related activities with his/her contacts.

The user belonging profile 200 displayed within the belonging tab 253 of the user profile 250 illustrates a belonging section 201 displaying the belongings of user 130. The belongings may be displayed as belonging icons having an image of the belonging and a name of the belonging. In one embodiment, the displayed belongings comprise belongings added by user 130 and maintained within the social graph of belongings. In one embodiment, the social graph of belongings may define an association between each of the one or more users and one or more belongings. Each belonging may comprise a belonging profile for storing information regarding the belonging. Such information may include a belonging category. The user may organize belongings into different categories. The category assignment may be performed when the user is adding the belonging into the social graph of belongings. Further the user may organize belongings into different categories after they have been added to the social graph of belongings.

The belonging icons displayed with the belonging section 201 of the graphical user interface of FIG. 2 may comprise a link to the belonging. The link may be embedded within the belonging icon. User 130 may select the link (e.g., by clicking the belonging icon) to view a belonging profile associated with the belonging. The selection of the link may result in the system accessing and displaying the belonging profile to user 130. An example of a belonging profile is illustrated below in the graphical user interface of FIG. 3, which will be described in further detail below.

As illustrated in the graphical user interface of FIG. 2, the belongings of user 130 are organized into belonging categories. The belonging categories displayed within the belonging profile 200, include gadgets, books and an uncategorized belonging category for uncategorized belongings added by user 130. A belonging may be assigned to one or more belonging categories when it is being added. In one embodiment, if user 130 does not assign the belonging to any belonging category, then the belonging may be automatically organized under the uncategorized belonging category. In another embodiment, user 130 may place belongings within the uncategorized belonging category, for example, when user 130 is not sure what category to assign to the belonging.

The graphical user interface of FIG. 2 further illustrates an "organize" button 202 and an "add" button 203. In one embodiment, by selecting the organize button 202, user 130 may reorganize his/her belongings (e.g., belongings displayed within the belonging section 201), such that different belongings may be organized under different belonging categories. In some aspects, user 130 may additionally be able to create new belonging categories. The add button 203 may be selected by user 130 to add a new belonging. In one embodiment, upon selecting the add button 203, user 130 may be provided with a graphical user interface for adding a new belonging. The belongings displayed within the belonging section 201 include the belongings associated with user 130 within the social graph of belongings maintained by the system.

The graphical user interface of FIG. 2 further illustrates a stream section 204 for displaying a belonging-related stream to user 130. Stream section 204 may display one or more posts related to belongings and associated with user 130. The one or more posts may include posts related to belongings of other users of the system (e.g., users 132 and 134) and shared with user 130 by the other users of the system, or posts of user 130 (e.g., posts generated in response to adding a belonging or performing some other activity with relation to a belonging). For example, the graphical user interface of FIG. 2 illustrates posts 205 and 207 shared with user 130 by other users of the system (e.g., users 132 and 134), as well as post 206 generated in response to user 130 adding a belonging. The retrieved posts may further be sorted before a number of the retrieved posts are selected to be displayed within the belonging-related stream. For example, retrieved posts may be sorted according to a date and time of the post (e.g., the time and date the post was created, generated or stored). Once the posts have been sorted, the system may then select a number of the posts ranked highest within the list of retrieved posts and may display the selected number of posts as the belonging-related stream. Stream section 204 may display the posts in a sorted list. The posts may be sorted according to date and time, or may be sorted according to other criteria specified by user 130.

The posts presented within the stream section 204 may include user-generated posts entered through the system (e.g., through a web interface or through a client application installed at the client device of the user). Additionally, users of the system may also create belonging-related posts through interaction with the system through a remote social networking site. For example, a client application in communication with the system may be integrated into one or more social networking sites and the user may create posts regarding belongings at the remote social networking site. In another embodiment, posts may further include posts automatically generated by the system, for example upon detecting a belonging-related activity of a user (e.g., user 130).

The graphical user interface of FIG. 2 may be presented to the user after the user logs into the system. User 130 may enter the system by logging into the system using pre-stored login information (e.g., a user name and password). If user 130 is a first time user, user 130 may register with the system and create login information (e.g., a user name and password) to be used for subsequent access to the system. Upon entering the system, user 130 may then be provided with the graphical user interface of FIG. 2. In another embodiment, the user may request to access his/her belonging profile (e.g., by selecting the belonging tab 253), and upon receiving the request, the system may provide user 130 with the graphical user interface of FIG. 2.

Upon detecting the presence of user 130, either when the user 130 logs into the system or when user 130 requests to access his/her user profile, the system may access all belonging-related posts and may identify those associated with user 130. In one embodiment, the system may maintain a database of all belonging-related posts related to the belongings within the social graph of belongings, including for example those created within the system or through a remote social networking site integrated with the system. Posts associated with user 130 may include posts relating to the belongings of user 130, including posts created by user 130, posts generated by the system in response to belonging-related activities of user 130, as well as posts by other users of the system (e.g., users 132 and 134) shared with user 130 (e.g., user 130 is listed as a contact with which the post is shared). The system may identify and retrieve these posts and select one or more of the retrieved posts to generate a belonging-related stream for the user. The belonging-related stream may then be displayed within the stream section 204 of the graphical user interface of FIG. 2.

The retrieved posts may further be sorted before a number of the retrieved posts are selected to be displayed within the belonging-related stream. For example, retrieved posts may be sorted according to a date and time of the post (e.g., the time and date the post was created, generated or stored). Once the posts have been sorted, the system may then selected a selected number of the posts ranked highest within the list of retrieved posts and may display the selected number of posts as the belonging-related stream. The process of providing a user with a belonging-related stream is further described below with respect to FIGS. 5 and 6.

The posts displayed within the graphical user interface of FIG. 2 may further include comments relating to one or more of the displayed posts. For example, stream section 204 of the graphical user interface of FIG. 2 illustrates comments 208 and 209, associated with post 205, and comment 210, associated with post 207. Comments displayed within the stream section 204 may include those comments relating to the displayed posts and associated with user 130. Comments having been shared with the user or entered by the user may be displayed within the stream section 204. The posts displayed within stream section 204 of the graphical user interface of the graphical user interface of FIG. 2 may further be sorted according to the date and time of the comments associated with each post.

As further illustrated within the graphical user interface of FIG. 2, each post includes a comment entry box 211, 212 and 213. Each comment entry box 211-213 may allow user 130 to add a comment regarding the respective post 205-207. User 130 may enter text corresponding to a comment regarding a belonging-related posts displayed within the belonging-related stream and upon completion may select to share the comment with one or more contacts with whom the posts associated with the comment may be shared. The system may detect the new comment and may begin the process of distributing the comment to one or more other contacts viewing the post at one or more remote social networking sites. In one embodiment, the comment may be distributed according to pre-stored belonging attributes of the specific belonging the post is in regards to. Further, comments may be associated with their respective posts and stored within a database maintained by the system (e.g., the database storing the posts). A time and date of creation of the comment may further be stored within the database.

A post entry box 214 is further illustrated within the stream section 204 of the graphical user interface of FIG. 2. The post entry box 214 may allow user 130 to enter a new post regarding his/her belongings (e.g., the belongings illustrated in the belonging section 201). User 130 may enter text corresponding to a post regarding a belonging and upon completion may select to share the post with selected contacts. The system may detect that a new post regarding the belonging has been added and may generate a post. Upon generating the post the system may begin the process of distributing the post to the selected contacts of user 130 at one or more remote social networking sites. In one embodiment, the post may be distributed according to pre-stored belonging attributes of the specific belonging the post is in regards to. Further, the post may be stored within a database of posts maintained by the system, and information relating to the post such as the list of contacts with which the post is shared may further be stored. The post may further be stored within a database maintained by the system. A date and time associated with the posts (e.g., the time the post was created, generated or stored) may be stored with the post. The post may then be detected by the system as a new post associated with user 130 and may be displayed within the stream section 204.

Each belonging-related post may include a link associated with the user creating the post and a link associated with the belonging the post is related to. The links may be embedded within the post, including the text and/or the image associated with the post. The links may be selectable by user 130 and upon selection may direct the user to a profile related to the link. For example, a link to each user provides access to the belonging profile of the user, while the link to a belonging provides access to the belonging profile of the belonging.

For example, each post may include the name of the user associated with the post. The link to the user may be embedded within the name. User 130 may select the link to view a user belonging profile or contact belonging profile of the user associated with the post, which may be a contact of user 130. The selection may result in the system accessing and displaying the belonging profile (e.g., user belonging profile 200 or contact belonging profile 400) of the user associated with the post. An example of a contact belonging profile of a contact of user 130 is illustrated below in the graphical user interface of FIG. 4.

Each post and/or comment may further include a link to the belonging the post is associated with. The link may be embedded within the post, including for example within the image included with the post and/or within the text of the post. For example, where the text of the post includes the name of the belonging, a link may be embedded within the belonging name. User 130 may select the link to view a belonging profile associated with the belonging, which may be a belonging of user 130 or a belonging of another user of the system, such as a contact of user 130. The selection of the link may result in the system accessing and displaying the belonging profile to user 130. An example of a belonging profile is illustrated below in the graphical user interface of FIG. 3.

FIG. 3 illustrates a screen-shot of an example graphical user interface for viewing and managing a belonging profile of a belonging within a social graph of belongings. The exemplary belonging profile 300 corresponds to a belonging owned by user 130. The belonging profile 300 may be displayed within the belonging tab 253 of the user profile 250.

The belonging profile 300 may include an image 301 of the belonging. The image 301 may be an actual image of the belonging, or may be an image of a similar item as the belonging. The image 301 may be an image chosen by user 130 when adding the belonging and stored within a belonging profile associated with the belonging. The graphical user interface of FIG. 3 further illustrates a set of buttons that may be displayed to user 130 for modifying the belonging profile including the "edit" button 302, "delete" button 303 and "add" button 304. The add button 304 may be selectable by user 130 to add a new belonging. In one embodiment, upon selecting the add button 304, user 130 is provided with a graphical user interface and may add a new belonging.

User 130 may select the edit button 302 to modify any of the information pertaining to the belonging, including the information included with the belonging attributes section 306 of the graphical user interface of FIG. 3. The belonging attributes section 306 includes belonging information such as a list of contacts that the belonging and posts related to the belonging are shared with, the categories the belonging is organized under, a description of the belonging and a rating of the belonging that may include both a rating indication as well as a review. In one embodiment, the information displayed in the belonging attributes section 306 includes information entered by user 130 at the time of adding the belonging. In one embodiment, the information displayed within the belonging attributes section 306 may include information maintained within a belonging profile of the belonging. Additionally, user 130 may select the edit button 302 to change the image 301. In one embodiment, upon selecting the edit button, user 130 may be presented with a graphical user interface and may modify one or more attributes of the belonging.

User 130 may further select to delete the entire belonging using the delete button 303. This may be the case in various situations such as when user 130 no longer owns the belonging, no longer wishes to borrow the belonging, or is no longer interested it the belonging. Upon deleting the belonging, the belonging may be removed from the social graph of belongings. The system may further retrieve all distributed and shared posts related to the belonging and may remove and/or modify the posts. A similar option may be provided when the user modifies information regarding the post. In one embodiment, the tracking and modification of posts is performed upon a user request. For example, in one embodiment, the system may prompt the user and provide user 130 with an option to retrieve and modify posts, or user 130 may request for the system to perform the tracking and modification without first being prompted.

In one embodiment, the system may detect the modification and/or deletion of the belonging, and may generate a post regarding the modification depending upon the sharing preferences of user 130 with regard to the belonging. In one embodiment, the post is then added to the database of belonging-related posts and may be displayed within a belonging-related stream (e.g., within the stream section 309)

The graphical user interface of FIG. 3 further illustrates a belongings browse section 305 including a belonging icon 307 and a browse arrow 308. In one instance, the belonging icon 505 corresponds to an image of the next belonging within the list of belongings of user 130. In one embodiment, the browse arrow 308 allows the user to advance to the belonging profile for the next belonging. In another embodiment, the browse arrow 308 may cause the belonging icon 307 to display the next belonging within the list of belongings of the user. According to several aspects, an additional belonging browse section may further be displayed on the left side of the image 301. The additional belonging browse section may display a belonging icon of the previous belonging within the belonging list of user 130 and may further include a browse arrow for allowing user 130 to move backwards within the list of belongings of user 130.

Further illustrated in the graphical user interface of FIG. 3 is a stream section 309. The stream section 309 displays posts associated with the belonging and user 130. That is, posts created by the users of the system (e.g., contacts of user 130 with whom posts regarding the belonging may be shared), and related to the belonging may be displayed within the stream section 309. The displayed posts may include posts associated with user 130, (e.g., posts created by user 130 or shared with user 130). The graphical user interface of FIG. 3 illustrates post 310 and post 311 related to the belonging and associated with user 130. It should be noted that one or more posts displayed within the stream section 309 of the graphical user interface of FIG. 3, may also be displayed within the stream section 204 of the belonging profile 200 of user 130 and/or within the belonging-related stream within the stream tab 255, illustrated in FIG. 2. For example, post 311 displayed within the stream section 309 of the graphical user interface of FIG. 3 is also displayed as post 206 displayed within the stream section 204 of the graphical user interface of FIG. 2. Stream section 309 may display the posts in a sorted list. The posts may be sorted according to date and time, or may be sorted according to other criteria specified by user 130.

The posts presented within the stream section 309 may include user-generated posts entered through the system (e.g., through a web interface or through a client application installed at the client device of the user). Additionally, users of the system may also create belonging-related posts through interaction with the system through a remote social networking site. For example, a client application in communication with the system may be integrated into one or more social networking sites and the user may create posts regarding belongings at the remote social networking site. In another embodiment, posts may further include posts automatically generated by the system, for example upon detecting a belonging-related activity of a user (e.g., user 130).

The graphical user interface of FIG. 3 may be displayed to user 130 when a request is received from user 130. For example, as described above, user 130 may select a link embedded within a post related to the belonging, either displayed at a graphical user interface of the system or at a remote social networking site, and in response to the selection the system may receive the request. Each belonging displayed within a user belonging profile (e.g., the user belonging profile 200 or the contact belonging profile 400 described below with reference to FIG. 4), may include a selectable link and user 130 may select the link, which may be detected by the system as a request to access the belonging profile of the selected belonging.

Upon receiving the request from user 130 to access a belonging profile of a selected belonging, the system may access all belonging-related posts and may identify those associated with the belonging displayed within the belonging profile 300. In one embodiment, the system may maintain a database of all belonging-related posts relating to the belonging of the social graph of belongings, including for example those created within the system or through a remote social networking site integrated with the system. The system may then identify one or more of the posts associated with the belonging which are further associated with the user, including posts created by user 130, posts generated by the system in response to belonging-related activities of user 130, as well as posts shared with user 130 by other users of the system (e.g., users 132 and 134). The system may identify and retrieve these posts and select one or more of the retrieved posts to generate a belonging-related stream for the user. The belonging-related stream may then be displayed within the stream section 309 of the graphical user interface of FIG. 3. The process of providing a user with a belonging-related stream is further described below with respect to FIGS. 5 and 6.

The belonging-related stream displayed within the stream tab 255 may further include comments relating one or more of the displayed posts. In one example, comments relating to the posts and associated with user 130, such as comments having been shared with user 130 or entered by user 130, may be displayed within the belonging-related stream displayed within the stream section 309 of the graphical user interface of FIG. 3. The posts displayed within the stream section 309 of the graphical user interface of FIG. 3 may be sorted according to the date and time of the comments associated with each of the one or more posts.

Further illustrated within the graphical user interface of FIG. 3, each post includes a comment entry box 312 and 313. Each comment entry box 312-313 allows user 130 to add a comment regarding the respective post 310 and 311. User 130 may enter text corresponding to a comment regarding a belonging-related posts displayed within the belonging-related stream and upon completion may select to share the comment with one or more contacts with whom the posts associated with the comment may be shared. The system may detect the new comment and may begin the process of distributing the comment to one or more other contacts viewing the post at one or more remote social networking sites. In one embodiment, the comment may be distributed according to pre-stored belonging attributes of the specific belonging the post is in regards to. Further, comments may be associated with their respective posts and stored within a database maintained by the system (e.g., the database storing the posts). A time and date of creation of the comment may further be stored within the database.

A post entry box 314 is further illustrated within the stream section 309 of the graphical user interface of FIG. 3. The post entry box 314, may allow user 130 to enter a new post regarding the belongings corresponding to the belonging profile 300. User 130 may enter text corresponding to a post regarding the belonging and upon completion may select to share the post with selected contacts. The system may detect that a new post regarding the belonging has been added. The system may then generate a post and may begin the process of distributing the post to the selected contacts of user 130 at one or more remote social networking sites. In one embodiment, the post may be distributed according to pre-stored belonging attributes of the specific belonging, for example including those displayed within the belonging attributes section 306 of the graphical user interface of FIG. 3. The post may further be stored within a database maintained by the system. A date and time associated with the posts (e.g., the time the post was created, generated or stored) may be stored with the post. The post may then be detected by the system as a new post associated with user 130 and may be displayed within the stream section 309.

Each belonging-related post may include a link associated with the user creating the post, and/or a link associated with the belonging the post is related to. The links may be integrated within the post, for example within the text and/or the image associated with the post. The links may be selectable by user 130 and upon selection may direct the user to a profile related to the link. For example, a link to each user provides access to the belonging profile of the user, while the link to a belonging provides access to the belonging profile of the belonging.

For example, each post may include a link to the belonging the post is associated with. The link may be embedded within the post, including for example within the image included with the post and/or within the text of the post. For example, where the text of the post includes the name of the belonging, a link may be embedded within the belonging name. User 130 may select the link to view a belonging profile associated with the belonging (similar to the belonging profile 300). Each post and/or comment may further include the name of the user associated with the posts (e.g., the user who created the post, or the user performing the belonging-related activity in response to which the post is generated). The link to the user, i.e. author, may be embedded within the name. User 130 may select the link to view a belonging profile associated with the author of the post, which may be a contact of user 130. The selection may result in the system accessing and displaying the belonging profile of the user associated with the post (e.g., user belonging profile 200 or contact belonging profile 400).

Figure 4:
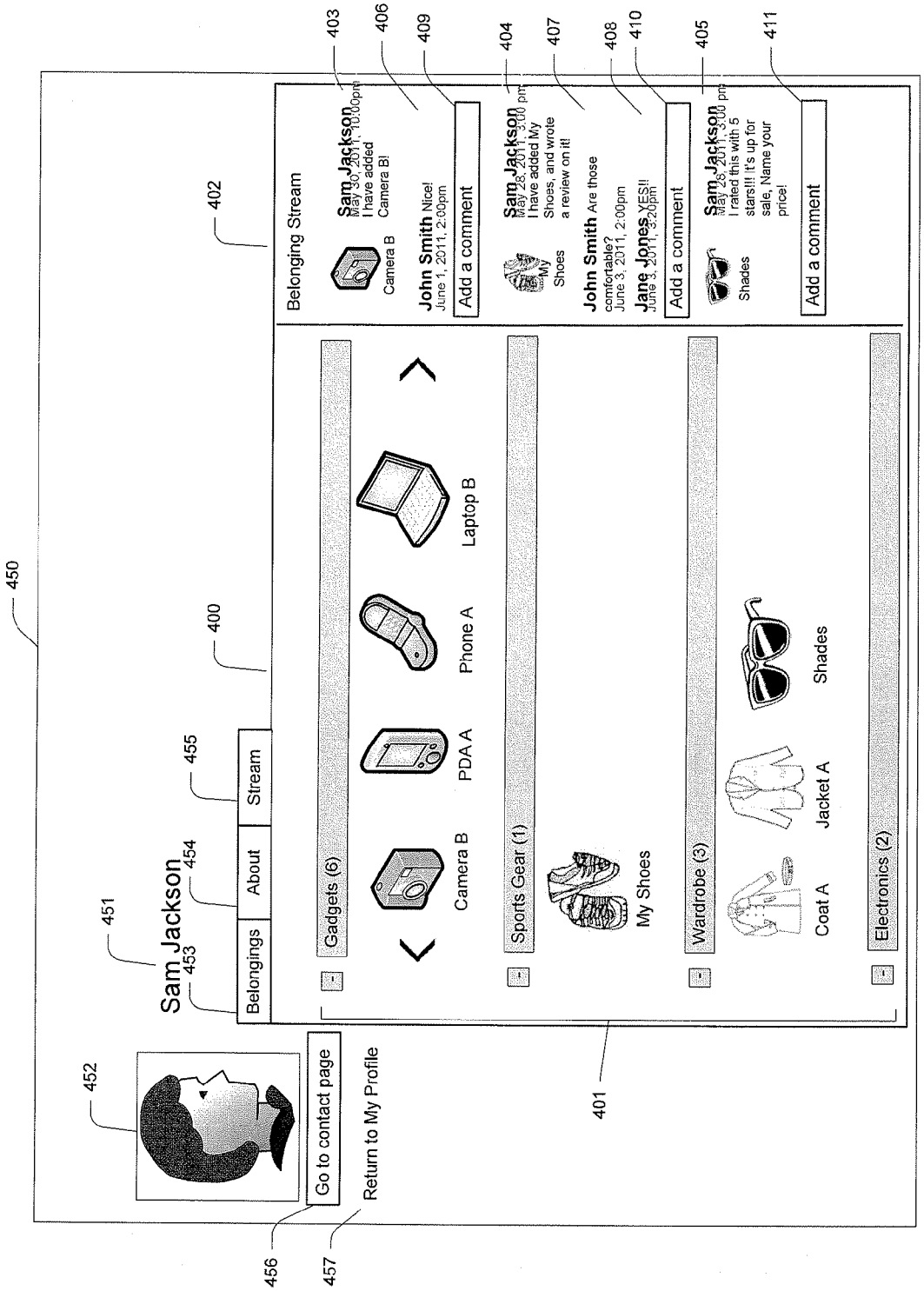
FIG. 4 illustrates a screen-shot of an example graphical user interface for viewing a contact belonging profile of a contact of a user of a system maintaining a social graph of belongings.

FIG. 4 illustrates a screen-shot of an example graphical user interface for viewing a contact profile 450 and a contact belonging profile 400 of a contact of a user of the system maintaining a social graph of belongings. The contact of user 130 is referred to herein as user 132 for exemplary purposes, but it should be understood that any user of the system may be a contact of another user of the system, depending upon associations of each user of the system as maintained at one or more remote social networking sites.

The graphical user interface of FIG. 4 illustrates a contact profile 450. The contact profile 450 may include general information regarding the contact (e.g., user 132), including the name of user 132 (e.g., item 451) and an image of the user 132 (e.g., item 452). Furthermore, a contact entry box 456 may be provided to allow user 130 to enter names of other contacts. Upon entering a contact name, user 130 may then be able to navigate to the belonging profile of the other contact (e.g., user 134) and may be able to browse the belongings of the other contact. Additionally, the contact profile 450 may include a link 457 which is selectable by user 130 to return the user to his/her user belonging profile 250 or user profile 200.

The contact profile 450 may also include multiple tabs, such as a "belongings" tab 453, an "about" tab 454 and a "stream" tab 455. The about tab 454 may include basic information regarding user 132 such as a list of contacts, an email address, and other such information. In one instance, such information may be entered by user 132 upon registering with the system. The user information may be stored within a user profile associated with user 132.

The stream tab 455 may display a stream of posts related to belongings of user 132 and shared with user 130 (e.g., streams similar to those displayed within the stream section 402). In one embodiment, the one or more posts include posts created by user 132 or generated in response to belonging-related activities of user 132, related to belongings of user 132 and shared with user 130 by user 132. Alternatively, the posts displayed may further include posts by other users of the system including posts by user 130, regarding the belongings of user 132. Stream tab 455 may display the posts in a sorted list. The posts may be sorted according to date and time, or according to other criteria specified by user 130 and/or user 132.

The posts presented within the stream tab 455 may include user-generated posts entered through the system (e.g., through a web interface or through a client application installed at the client device of the user). Additionally, users of the system may also create belonging-related posts through interaction with the system through a remote social networking site. For example, a client application in communication with the system may be integrated into one or more social networking sites and the user may create posts regarding belongings at the remote social networking site. In another embodiment, posts may further include posts automatically generated by the system, for example upon detecting a belonging-related activity of a user (e.g., user 132).

Upon receiving an indication of a selection of a user 130 to view a belonging profile of a contact (e.g., belonging profile 400 of user 132), for example by selecting a link to user 132 (e.g., a link within a post) or by entering the contact's name within the contact entry box 256, the system may access all belonging-related posts created by user 132 or generated in response to a belonging-related activity of user 132 and/or posts related to belongings of user 132, and may identify the posts associated with user 130 (e.g., those posts shared with user 130).

In one embodiment, the system may maintain a database of all belonging-related posts concerning belongings of the social graph of belongings, including for example those created within the system or through a remote social networking site integrated with the system. The system may access the database and retrieve posts created by user 132 and/or generated in response to a belonging-related activity by user 132. The system may then identify the retrieved posts shared with user 130. The system may then select one or more of the identified posts to generate a belonging-related stream. The retrieved posts may further be sorted before a number of the retrieved posts are selected to be displayed within the belonging-related stream. For example, retrieved posts may be sorted according to a date and time of the post (e.g., the time and date the post was created, generated or stored). Once the posts have been sorted, the system may then selected a selected number of the posts ranked highest within the list of retrieved posts and may display the selected number of posts as the belonging-related stream. The belonging-related stream may then be displayed within the stream tab 455 of the contact belonging profile 450 displayed to user 130. The process of providing a user with a belonging-related stream is further described below with respect to FIGS. 5 and 6.

The belonging-related stream displayed within the stream tab 455 may further include comments relating one or more of the displayed posts. In one example, comments having been shared with user 130 or entered by user 130 may be displayed within the stream tab 455. The posts displayed in the belonging-related stream displayed within the stream section 401 may further be sorted according to the date and time of the comments associated with each of the one or more posts.

Further, a comment entry box may be displayed along with each displayed post allowing user 130 to add a comment regarding the respective post. User 130 may enter text corresponding to a comment regarding a belonging-related posts displayed within the belonging-related stream and upon completion may select to share the comment with one or more contacts with whom the posts associated with the comment may be shared. The system may detect the new comment and may begin the process of distributing the comment to one or more other contacts viewing the post at one or more remote social networking sites. In one embodiment, the comment may be distributed according to pre-stored belonging attributes of the specific belonging the post is in regards to. Further, comments may be associated with their respective posts and stored within a database maintained by the system (e.g., the database storing the posts). A time and date of creation of the comment may further be stored within the database.

Each belonging-related post may include a link associated with the user creating the post and a link associated with the belonging the post is related to. The links may be embedded within the post, such as within the text and/or the image associated with the post. The links may be selectable by user 130 and upon selection may direct the user to a profile related to the link. For example, a link to each user provides access to the belonging profile of the user, while the link to a belonging provides access to the belonging profile of the belonging.

For example, each post may include the name of the user associated with the post. The link to the user may be embedded within the displayed name. User 130 may select the link to view a belonging profile associated with the author of the post, which may be a contact of user 130. The selection may result in the system accessing and displaying the belonging profile of the user associated with the displayed post (e.g., the graphical user interface of FIG. 4).

Each post may further include a link to the belonging the post is associated with. The link may be embedded within the post, including for example within the image included with the post and/or within the text of the post. For example, where the text of the post includes the name of the belonging, a link may be embedded within the belonging name. The link may alternatively or additionally be embedded within the image displayed along with each post. User 130 may select the link to view a belonging profile associated with the belonging, which may be a belonging of user 130 or a belonging of another user of the system, for example a contact of user 130. The selection of the link may result in the system accessing and displaying the belonging profile to user 130 similar to the belonging profile illustrated in the graphical user interface of FIG. 3.

Comments displayed with the belonging-related stream may further include a link (e.g., a link to the user associated with the comment). The link may be embedded within the comment. For example, the comment may be displayed along with the name of the user who entered the comment and a link may be embedded within the name of the user. The selection of the link may result in the system accessing and displaying the belonging profile of the user associated with the displayed post. An example of a belonging profile of a contact of user 130 is illustrated below in the graphical user interface of FIG. 4.

The belongings tab 453 may provide user 130 with a contact belonging profile 400 of his/her contact (e.g., user 132), enabling user 130 to interact with the belongings of user 132.

The contact belonging profile 400 of the graphical user interface of FIG. 4 illustrates a belonging section 401 displaying the belongings of user 132. In one embodiment, the displayed belongings comprise belongings added by user 132 and maintained within the social graph of belongings. In one embodiment, the social graph of belongings may define an association between a set of users (i.e. all users subscribing to the system) and the user's belongings with the user. Each belonging may comprise a belonging profile for storing information regarding the belonging. Such information may include a belonging category. Each user may organize his/her belongings into different categories. A belonging may be assigned to one or more belonging categories when it is being added. The category assignment may be performed when the user is adding the belonging into the social graph of belongings. Further the user may organize belongings into different categories after they have been added to the social graph of belongings.

As illustrated in the graphical user interface of FIG. 4, the belongings of user 132 are organized into at least 4 belonging categories. The belonging categories include gadgets, sports gear, wardrobe and electronics. As illustrated, the belongings of user 132 may exceed the size of the screen and thus user 130 may have to scroll through the page to view all belongings of user 132. In one embodiment, if user 132 does not assign the belonging to any belonging category, then the belonging may be automatically organized under an uncategorized belonging category (not shown).

The belongings of user 132 displayed within the graphical user interface of FIG. 4 may be displayed as belonging icons having an image of the belonging and a name of the belonging. The belonging icons displayed with the belonging section 401 may comprise a link to the belonging. The link may be embedded within the belonging icon. User 130 may select the link (e.g., by clicking the belonging icon) to view a belonging profile associated with the belonging. The selection of the link may result in the system accessing and displaying the belonging profile to user 130 (e.g., a belonging profile similar to the belonging profile 300 of FIG. 3).

The graphical user interface of FIG. 4 further illustrates a stream section 402 for displaying a belonging-related stream to user 130. Stream section 402 may display one or more posts related to belongings of user 132, created by user 132 and/or generated in response to belonging-related activity of user 132, and associated with user 130. In one embodiment, the one or more posts include posts created by user 132 and/or generated by the system and related to belongings of user 132 that are shared with user 130. For example, the graphical user interface of FIG. 4 illustrates posts 403, 404 and 405, each post being related to a belonging of user 132 and shared with user 130. Stream section 204 may display the posts in a sorted list. The post may further be stored within a database maintained by the system. A date and time associated with the posts (e.g., the time the post was created, generated or stored) may be stored with the post.

The posts presented within the stream section 402 may include user-generated posts entered through the system (e.g., through a web interface or through a client application installed at the client device of the user). Additionally, users of the system may also create belonging-related posts through interaction with the system through a remote social networking site. For example, a client application in communication with the system may be integrated into one or more social networking sites and the user may create posts regarding belongings at the remote social networking site. In another embodiment, posts may further include posts automatically generated by the system, for example upon detecting a belonging-related activity of a user (e.g., user 130).

Upon receiving an indication of a selection by user 130 to view a belonging profile of a contact (e.g., belonging profile 400 of user 132), for example by selecting a link to user 132 (e.g., a link within a post) or by entering the contact's name within the contact entry box 256, the system may access all belonging-related posts created by user 132 or generated in response to a belonging-related activity of user 132 and may identify the posts associated with user 130 (e.g., those posts shared with user 130). Furthermore, posts regarding the belongings of user 132 and associated with user 130 (e.g., shared with user 130) may be retrieved. In one embodiment, the system may maintain a database of all belonging-related posts concerning belongings of the social graph of belongings, including for example those created within the system or through a remote social networking site integrated with the system. The system may access the database and retrieve posts created by user 132, generated in response to a belonging-related activity by user 132 and/or related to a belonging of user 132. The system may then identify the retrieved posts shared with user 130. The system may then select one or more of the identified posts to generate a belonging-related stream. The post may further be stored within a database maintained by the system. A date and time associated with the posts (e.g., the time the post was created, generated or stored) may be stored with the post. The belonging-related stream may then be displayed within the stream section 402 of the contact belonging profile 400 displayed to user 130. The process of providing a user with a belonging-related stream is further described below with respect to FIGS. 5 and 6.

The belonging-related stream displayed within the stream section 402 may further include comments relating one or more of the displayed posts. For example, the graphical user interface of FIG. 4 illustrates post 403 having a comment 406 and post 404 having two comments 407, and 408 displayed. In one example, comments having been shared with the user or entered by the user may be displayed within the stream section 402 of the graphical user interface of FIG. 4. The posts displayed in the belonging-related stream displayed within the stream section 401 may further be sorted according to the date and time of the comments associated with each of the one or more posts.

Further, a comment entry box may be displayed along with each displayed post allowing user 130 to add a comment regarding the respective post. The graphical user interface of FIG. 4 illustrates comment entry boxes 409, 410 and 411 being displayed, each corresponding to the posts 403, 404 and 405 respectively. User 130 may enter text corresponding to a comment regarding a belonging-related post displayed within the belonging-related stream and upon completion may select to share the comment with user 132. The system may detect the new comment and may begin the process of distributing the comment to the user 132 and/or to one or more other users viewing the post at one or more remote social networking sites. In one embodiment, the comment may be distributed according to pre-stored belonging attributes of the specific belonging the post is in regards to.

Each belonging-related post may include a link associated with the user creating the post and a link associated with the belonging the post is related to. The links may be integrated within the post, including the text and/or the image associated with the post. The links may be selectable by user 130 and upon selection may direct the user to a profile related to the link. For example, a link to each user provides access to the belonging profile of the user, while the link to a belonging provides access to the belonging profile of the belonging.

For example, each post may include the name of the user associated with the post. The link to the user may be embedded within the displayed name. User 130 may select the link to view a belonging profile associated with the author of the post, which may be a contact of user 130. The selection may result in the system accessing and displaying the belonging profile of the user associated with the displayed post (e.g., the graphical user interface of FIG. 4).

Each post may further include a link to the belonging the post is associated with. The link may be embedded within the post, including for example within the image included with the post and/or within the text of the post. For example, where the text of the post includes the name of the belonging, a link may be embedded within the belonging name. The link may alternatively or additionally be embedded within the image displayed along with each post. User 130 may select the link to view a belonging profile associated with the belonging, which may be a belonging of user 130 or a belonging of another user of the system, for example a contact of user 130. The selection of the link may result in the system accessing and displaying the belonging profile to user 130 similar to the belonging profile illustrated in the graphical user interface of FIG. 3.

Furthermore, comments may further include a link (e.g., a link to the user associated with the comment). The link may be embedded within the comment. For example, the comment may be displayed along with the name of the user who entered the comment and a link may be embedded within the name of the user. The selection of the link may result in the system accessing and displaying the belonging profile of the user associated with the displayed post. An example of a belonging profile of a contact of user 130 is illustrated below in the graphical user interface of FIG. 4.

Figure 5:
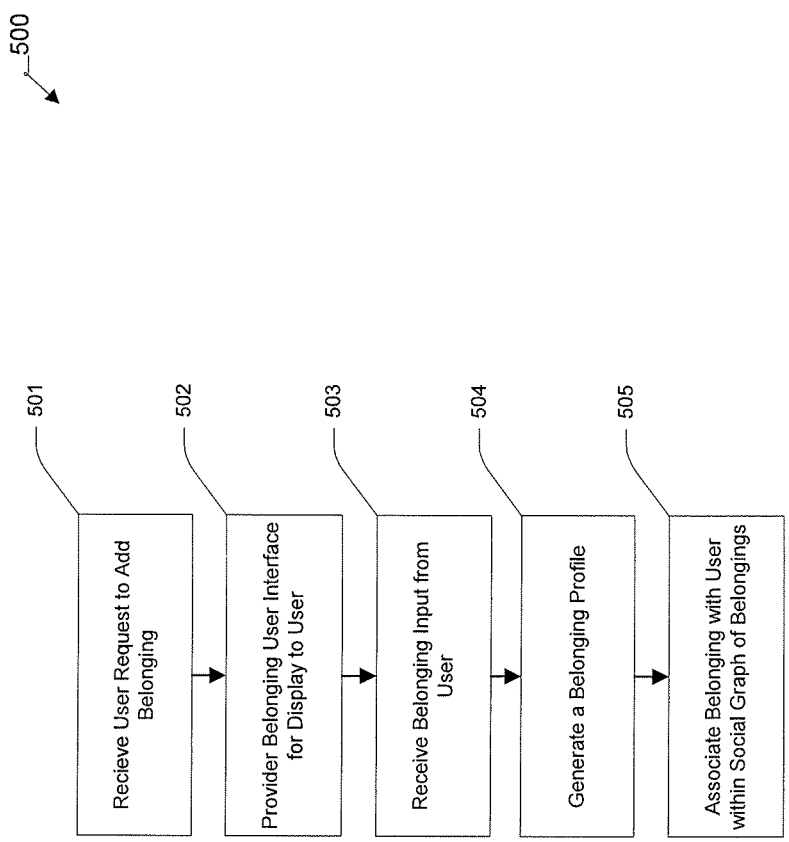
FIG. 5 illustrates a flow chart of a process for generating and maintaining a social graph of belongings.

FIG. 5 illustrates a flow chart illustrating a process 500 for generating and maintaining a social graph of belongings. The process 500 begins in step 501 when the system receives a user request to add a new belonging, for example from user 130. In some aspects, the user request may be received when user 130 selects to add a belonging, for example by selecting the add button when viewing a graphical user interface of a belonging profile (e.g., add button 304) or when viewing a graphical user interface of a user belonging profile (e.g., add button 203). Alternatively, the system may receive the user request to add a new belonging when user 130 selects a suggested belonging provided to the user by the system.

Next, in step 502 the system may provide a graphical user interface for display to user 130 for adding a new belonging. User 130 may then enter attributes regarding the belonging, such as a name of the belonging, an image of the belonging, contacts to share activities related to belongings with, belonging categories associated with the belonging, a belonging sharing preference, belonging description, belonging review and ranking, belonging state and/or belonging purchase information. In some embodiments, the attributes may be similar to those illustrated in the belonging attributes section 306 of the graphical user interface of FIG. 3.

In step 503, the system receives a belonging input from the user. For example, the user may select a save item button, and the information regarding the belonging may then be received by the system. Next, the process continues to step 504 in which the system generates a belonging profile based upon the information entered by user 130 and received in step 503. Next, in step 505, the system associates the belonging and/or the belonging profile with user 130. As described above, a social graph of belongings may be generated and maintained by the system. The social graph of the belongings, according to some aspects, includes associations between a user and belongings of that user for all users of the system. In step 505, the system may add the new belonging entry into the social graph of belongings as a belonging of the user 130, thus expanding the social graph of belongings through the new user-belonging association.

In some aspects, once user 130 and the belonging inputted in step 503 have been associated, the system may then generate and distribute posts related to the belonging to one or more contacts of user 130. In one embodiment, user 130 selects one or more contacts and/or groups of contacts, which the user wishes to share the user's belonging activities with. In some embodiments, adding the belonging is detected as a belonging-related activity and thus the system may initiate the process for generating and sharing a post related to the belonging with the contacts selected by the user.

Figure 6:
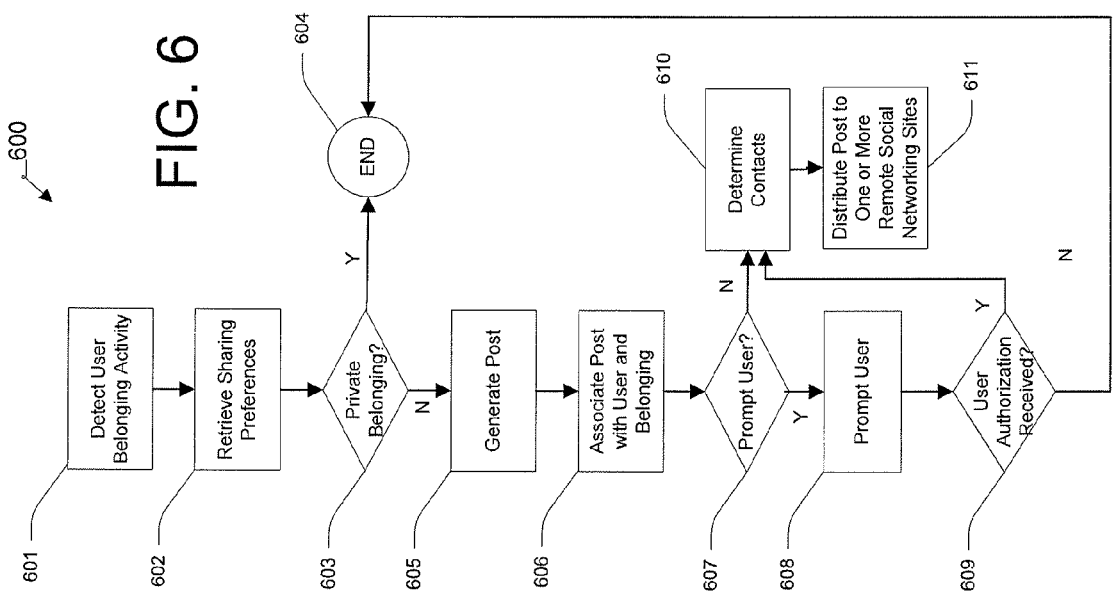
FIG. 6 illustrates a flow chart of a process for generating and distributing a post representing a user activity with respect to a belonging.

FIG. 6 illustrates a flow chart illustrating a process 600 for generating a belonging-related post and sharing the post with contacts of a user. In step 601, the process 600 begins when the system detects a belonging-related activity by a user, for example user 130. As described above, the belonging-related activity may include a new belonging being added. Other examples of belonging-related activity may include a user modifying a belonging, deleting a belonging, adding a new post regarding a belonging and adding a new comment regarding the belonging.

Upon detecting the belonging-related activity, in step 602 the system retrieves sharing preferences with respect to the belonging. The sharing preference of a belonging may be stored within the belonging profile of the belonging generated in step 504 of process 500. A user (e.g., user 130), may set the sharing preferences by selecting a sharing preference when adding the belonging. User 130 may also modify the sharing preferences for a belonging already added and stored within the social graph of belongings, for example by selecting to modify the belonging, or by setting the sharing preference upon receiving a prompt when a post is being shared with contacts of the user.

In step 603, based on the retrieved sharing preferences, the system may determine whether the activity detected in step 601 is associated with a private belonging. When a user selects to not share any posts regarding a belonging with contacts, the belonging may be stored as a private belonging. Similarly, the post may also be private if no contacts are selected.

If in step 603, the system determines that the belonging is a private belonging, then the process ends in step 604. Otherwise, in step 605, the system generates a post regarding the belonging-related activity detected in step 601. Generating a post may comprise generating text regarding the activity and appending an image of the belonging to the text to generate a post. The text may be system generated and pre-stored text. For example, the system may store pre-generated text associated with each specific action, and upon detecting the action, may retrieve the pre-stored and pre-generated text associated with the specific action detected in step 601. In another embodiment, the text may include user-generated text, for example, text entered within a post entry box (e.g., post entry box 214 of the graphical user interface of FIG. 2 or post entry box 314 of the graphical user interface of FIG. 3). The image may, in some examples, correspond to the main image selected by user 130 and stored within the belonging profile of the belonging associated with the detected belonging-related activity.

Next, in step 606, the system associates the post with the belonging associated with the belonging-related activity detected in step 601, and further with user 130 associated with the belonging. In one instance, each post may be assigned a unique identifier. The unique identifier may be associated with a belonging the post is related to and/or a user associated with the belonging. In one exemplary instance, the system may track the post through the unique identifier. For example, the post may be linked with the unique identifier such that after distribution the post may be retrieved and modified using the link, even after the post has be distributed and displayed to contacts.

In step 606, a link associated with user 130 and a link associated with the belonging may further be included within the post generated in step 605. In one instance, for example, the generated post may include the name of user 130 and the name of user 130 may include a link to user 130. In one embodiment, the link to user 130 may be selectable and upon selection may access and display the belonging profile of user 130 (e.g., the user belonging profile illustrated in the graphical user interface of FIG. 2). In another instance, a link to the belonging may be included within the post. For example, in one instance the link may be inserted within the text or image of the post. The link to the post may be selectable and upon selection may access and display the belonging profile of the belonging.

In step 607, the system may determine whether user 130 should be prompted before the post is shared. For example, the system may look at the sharing preference retrieved in step 602 to determine whether user 130 has selected the prompt to post option. If it is determined that user 130 should be prompted, the process 600 continues to step 608 and prompts user 130, for example by displaying a prompt window. The user may in some instances view and modify the post, before authorizing that the post be shared with contacts. Next, in step 609, the system determines whether user 130 has authorized sharing the post with contacts selected by user 130. If it is determined that user 130 has not authorized the post, then the system continues to step 604 and ends the process.

Otherwise, in step 610 the system determines contacts to share the post with. The contacts may be stored within the belonging profile. In one embodiment, the determined contacts may be associated with one or more remote social networking sites. In step 611, the system distributes the post to the one or more remote social networking sites, and requests that the post be displayed to the selected users identified in step 610. Similarly, if in step 607 it is determined that that user 130 should not be prompted, the process 600 continues to step 610 and then to step 611 where the post is distributed to the one or more remote social networking sites, requesting that the post be displayed to the determined contacts at the one or more remote social networking sites.

The one or more remote social networking sites may provide API functionality for receiving and posting posts. In such embodiments, the system generates an API call to each of the one or more remote social networking sites to display the post. In one instance, the post may be displayed along with other posts by user 130 within the one or more remote social networking sites and shared with the one or more determined contacts. After distribution, the post may be retrieved and modified using the unique identifier, the link to the user and/or the link to the belonging. For example, a user may modify information regarding the belonging, may delete the belonging or may perform other activity with respect to the belonging. In such instances, it may be beneficial to update the posts related to the belonging in view of the action performed by the user.

The post may further be stored within a database maintained by the system. A date and time associated with the posts (e.g., the time the post was created, generated or stored) may be stored with the post for later retrieval and display within a belonging-related stream.

Figure 7:
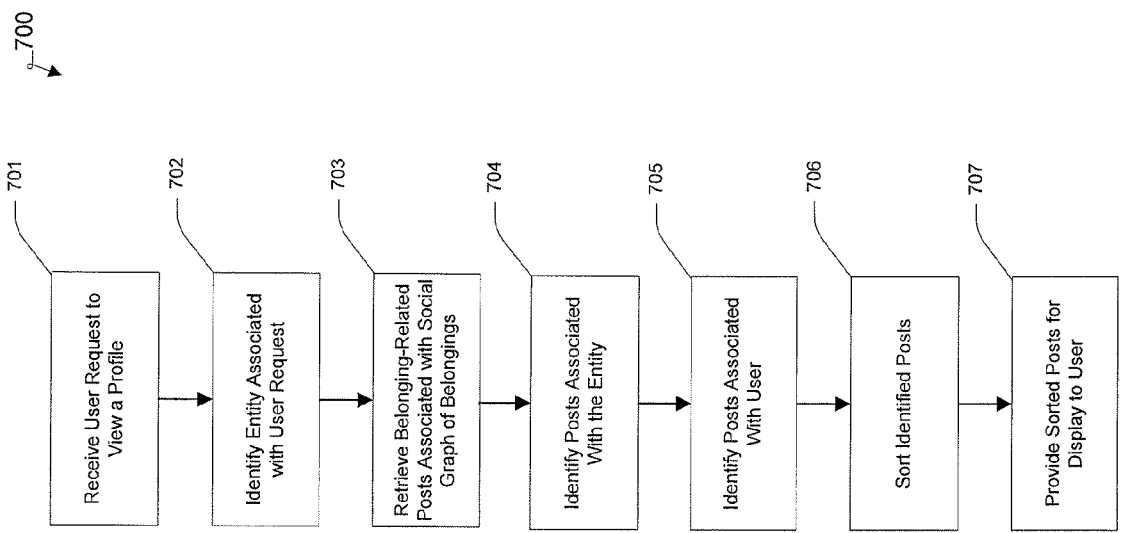
FIG. 7 illustrates a flow chart illustrating a process for displaying a belonging-related stream to a user of a system maintaining a social graph of belongings.

FIG. 7 illustrates a flow chart illustrating a process for displaying a belonging-related stream to a user of the system maintaining a social graph of belongings. At step 701 the process begins when the system receives a user request to view a profile from a first user of the system (e.g., user 130). The user request may be received in response to various selections and input from user 130.

The user request received in step 701 may be a user request to view a user profile (e.g., user profile 250), a user belonging profile (e.g., user belonging profile 200), a belonging profile (e.g., belonging profile 300), a contact profile (e.g., contact profile 450) or a contact belonging profile (e.g., contact belonging profile 400).

A request may be received when user 130 first enters the system, for example by logging into the system. User 130 may enter the system by logging into the system using pre-stored login information (e.g., a user name and password). If user 130 is a first time user, user 130 may register with the system and create login information (e.g., a user name and password) to be used for subsequent access to the system. In one aspect the system receives the user request when user 130 logs into the system.

Additionally, a request may be received when user 130 requests to view a profile by selecting a link (e.g., a link to a user or a link to a belonging). For example, user 130 may select a link embedded within a post or comment corresponding to the user associated with the post or comment or the belonging associated with the post or comment and in response to the selection the system may detect a user request. In another embodiment, belonging displayed within a user belonging profile (e.g., the user belonging profile 200) or a contact belonging profile (e.g., the contact belonging profile 400), may include a selectable link and user 130 may select the link, which may be received by the system as a user request to view a profile relating to the selected user and/or the selected belonging.

Furthermore, the user may request to view a profile (e.g., user belonging profile 200 or contact belonging profile 400), by selecting a belonging tab (e.g., belonging tab 253 or 453). The request may also comprise an entry of a user within a search tab or other text entry field which allows the user to access a profile (e.g., contact entry box 256). In other aspects, a request may be received through other user input or user selection.

In step 702 the system identifies the entity associated with the request. As described above, a request may be associated with a user of a system (e.g., user 130 or a contact of user 130) or a belonging of a user of the system. In one aspect, the users and belongings are those associated with the social graph of belongings. In step 702, the system analyzes the user request to determine the entity associated with the request received from the user (e.g., the profile that should be presented to the user in response to the request).

Next, in step 703 the system accesses the posts stored within the system (e.g., posts associated with the social graph of belongings). In step 704, the system identifies one or more posts of the retrieved posts associated with the identified entity (e.g., with the user or belonging).

For example, if the request is associated with the user 130, the posts identified in step 704 may include posts created by user 130, posts generated in response to belonging-related activity of user 130, posts by other users of the system regarding one or more belongings of user 130 and/or posts by other users of the system shared with user 130. Alternatively, if the profile is identified as being associated with a contact of user 130 (e.g., user 132), the posts identified in step 704 may include posts created by user 132, and/or posts generated in response to belonging-related activities of user 132. On the other hand, if the profile is identified as being associated with a belonging, the posts identified in step 704 may include posts created by users of the system (e.g., users 130, 132 and 134) regarding the belonging or posts generated in response to belonging-related activity with respect to the belonging.

In step 705, the system then determines which of the posts identified in step 704 are associated with the user (e.g., user 130). The posts associated with user 130 may include posts created by user 130, posts generated in response to belonging-related activities performed by user 130, posts regarding the belongings of user 130 and/or posts shared with user 130 by other users of the system.

Next, in step 706, the posts identified in step 705 may be sorted. The posts may be sorted according to date and time of the post, or may be sorted according to other criteria specified by user 130. In one aspect, the posts identified in step 705 may further include comments corresponding to the post. In one example, comments having been shared with user 130 or entered by user 130 may further be retrieved. The posts may further be sorted according to the date and time of the comments associated with each of the one or more posts.

Finally, in step 707 the system may provide the sorted posts for display to the user. For example, the client device of user 130 may display a user graphical interface displaying a belonging-related stream including the one or more of the posts identified in step 705 as sorted in step 706. The number of posts displayed within the graphical user interface may depend upon the number of posts identified in step 705, a predefined number based on system settings or user preference, and/or the number of posts that may be displayed within the graphical user interface.

Each belonging-related post may include a link associated with the user creating the post and a link associated with the belonging the post is related to. The links may be integrated within the post, including the text and/or the image associated with the post. The links may be selectable by user 130 and upon selection may direct the user to a profile related to the link. For example, a link to each user provides access to the belonging profile of the user, while the link to a belonging provides access to the belonging profile of the belonging.

For example, each post and/or comment may include the name of the user associated with the post. The link to the user may be embedded within the displayed name. User 130 may select the link to view a belonging profile associated with the author of the post, which may be a contact of user 130. The selection may result in the system accessing and displaying the belonging profile of the user associated with the displayed post (e.g., user belonging profile 200 of FIG. 2 and the contact belonging profile 400 of graphical user interface of FIG. 4.)

Each post and/or comment may further include a link to the belonging the post is associated with. The link may be embedded within the post, including for example within the image included with the post and/or within the text of the post. For example, where the text of the post includes the name of the belonging, a link may be embedded within the belonging name. The link may alternatively or additionally be embedded within the image displayed along with each post. User 130 may select the link to view a belonging profile associated with the belonging, which may be a belonging of user 130 or a belonging of another user of the system, for example a contact of user 130. The selection of the link may result in the system accessing and displaying the belonging profile to user 130 (e.g., belonging profile 300 of the graphical user interface of FIG. 3.

Figure 8:
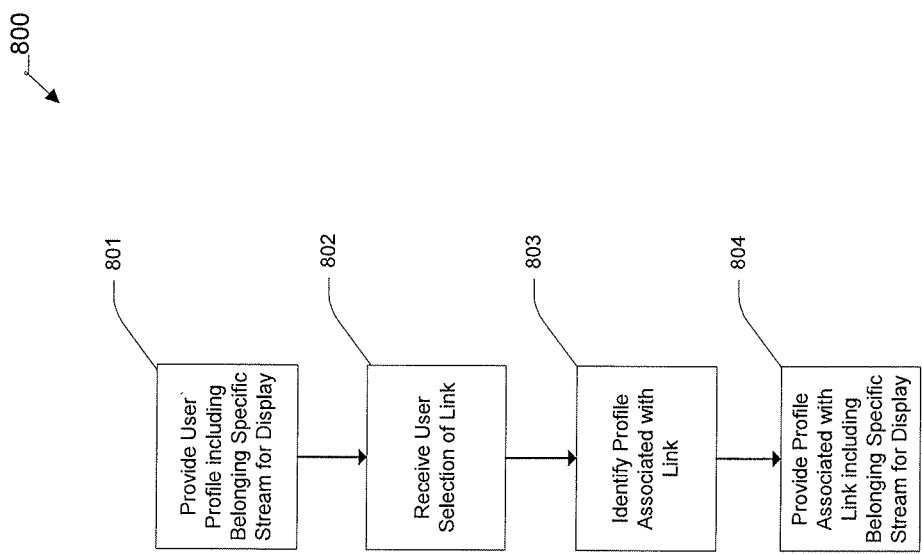
FIG. 8 illustrates a flow chart illustrating an alternative process for displaying a belonging-related stream to a user of a system maintaining a social graph of belongings.

FIG. 8 illustrates a flow chart illustrating a process for providing a user with a user interface displaying a belonging-related stream to a user of the system maintaining a social graph of belongings. At step 801, the system may provide the user profile including a belonging-related stream for display to user 130. For example, the client device of user 130 may display a graphical user interface displaying a user profile. The user profile includes at a least a belonging-related stream. In another embodiment, the user profile may further include a belonging section (e.g., belonging section 201 and 401), displaying one or more belongings. The belonging-related stream includes one or more belonging-related posts. Each belonging-related post may include a link associated with the user creating the post and a link associated with the belonging the post is related to. The links may be integrated within the post, including the text and/or the image associated with the post. The links may be selectable by user 130 and upon selection may direct the user to a profile related to the link. For example, a link to each user provides access to the belonging profile of the user, while the link to a belonging provides access to the belonging profile of the belonging.

The process then continues to step 802, where the system receives an indication of a user selection of the links provided within the posts of the belonging-related stream. The user selection includes a selection of a link of the user associated with the belonging-related post or the belonging associated with the belonging-related post. In step 803, the system identifies a profile associated with the link selected by the user.

In step 804, provides the identified profile for display to the user. For example, the client device of the user may display a graphical user interface displaying a profile associated with the link (e.g., a user profile, a contact profile or a belonging profile), including a belonging-related stream associated with the profile. For example, if user 130 selects the link to the user associated with the post, then a profile of the user associated with the post is presented to user 130 (e.g., user belonging profile 200, user profile 250, contact belonging profile 400 or contact profile 450). On the other hand, if the selection is of a belonging associated with the posts, a belonging profile associated with the belonging may be displayed (e.g., belonging profile 300).

Figure 9:
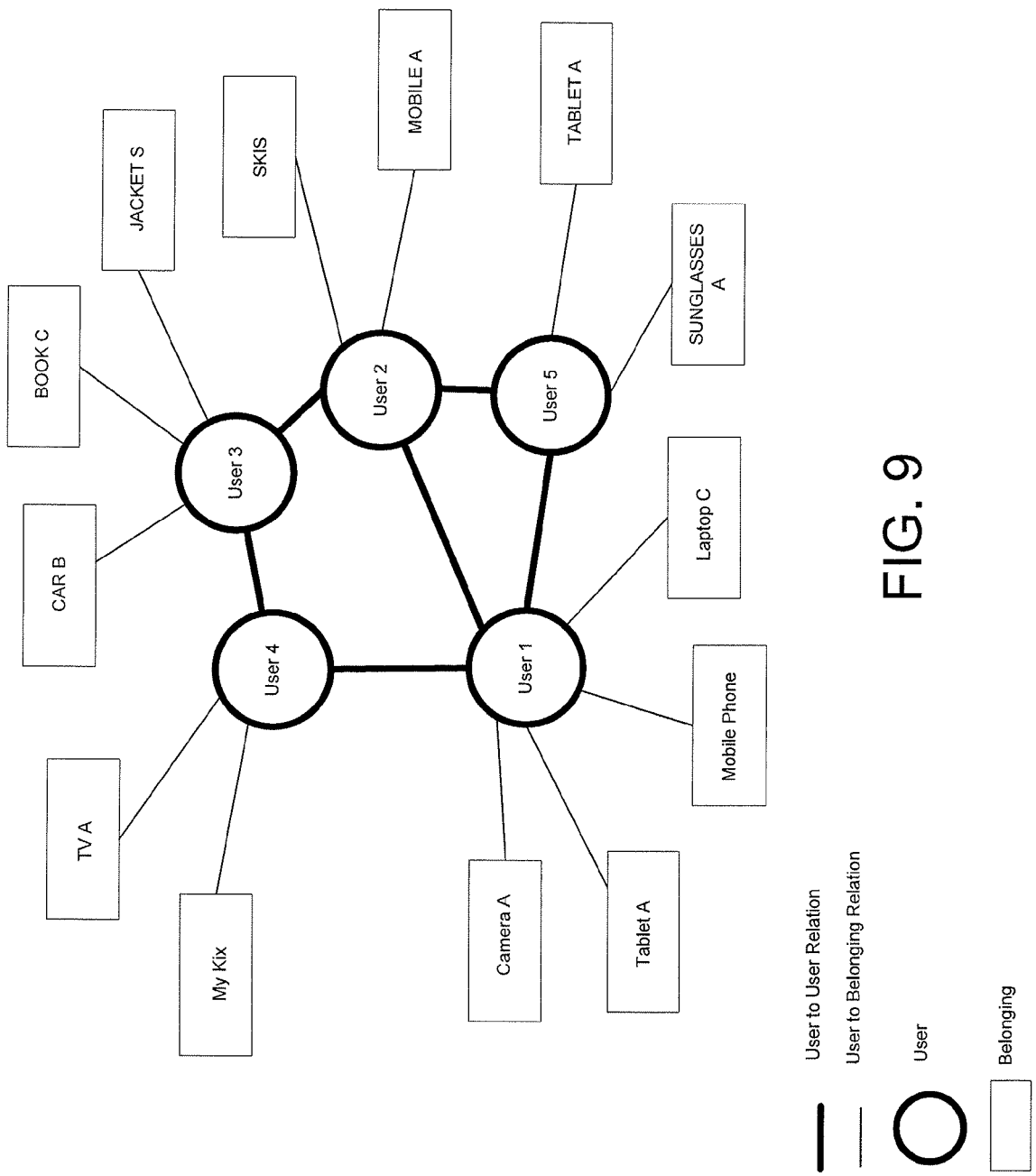
FIG. 9 illustrates an exemplary social graph of belongings.

FIG. 9 illustrates an exemplary social graph of belongings. As illustrated, the social graph of belongings includes one or more users. Each of the one or more users is associated with one or more belongings. Furthermore, as illustrated, the social graph of belongings may further define associations between the user and other users within the social graph of belonging (i.e., his/her contacts). The exemplary social graph of belongings includes associations among users 1-5 and further defines associations between each of the users 1-5 and one or more belongings.

More specifically, user 1 is associated with user 2, user 4 and user 5. Furthermore, User 1 is associated with belongings including "Camera A", "Tablet A", "Mobile Phone" and "Laptop C". User 2 is illustrated as being associated with user 1, user 3 and user 5, and with belongings including "SKIS" and "MOBILE A". User 3 is illustrated as being associated with user 2 and user 4, and further with belongings including "CAR B", "BOOK C" and "JACKET S". User 4 is illustrated as associate with user 1 and user 3 and belongings including "TV A" and "My Kix". Finally, User 5 is illustrated as being associated with user 1 and user 2 and with belongings including "TABLET A" and "SUNGLASSES A".

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 10:
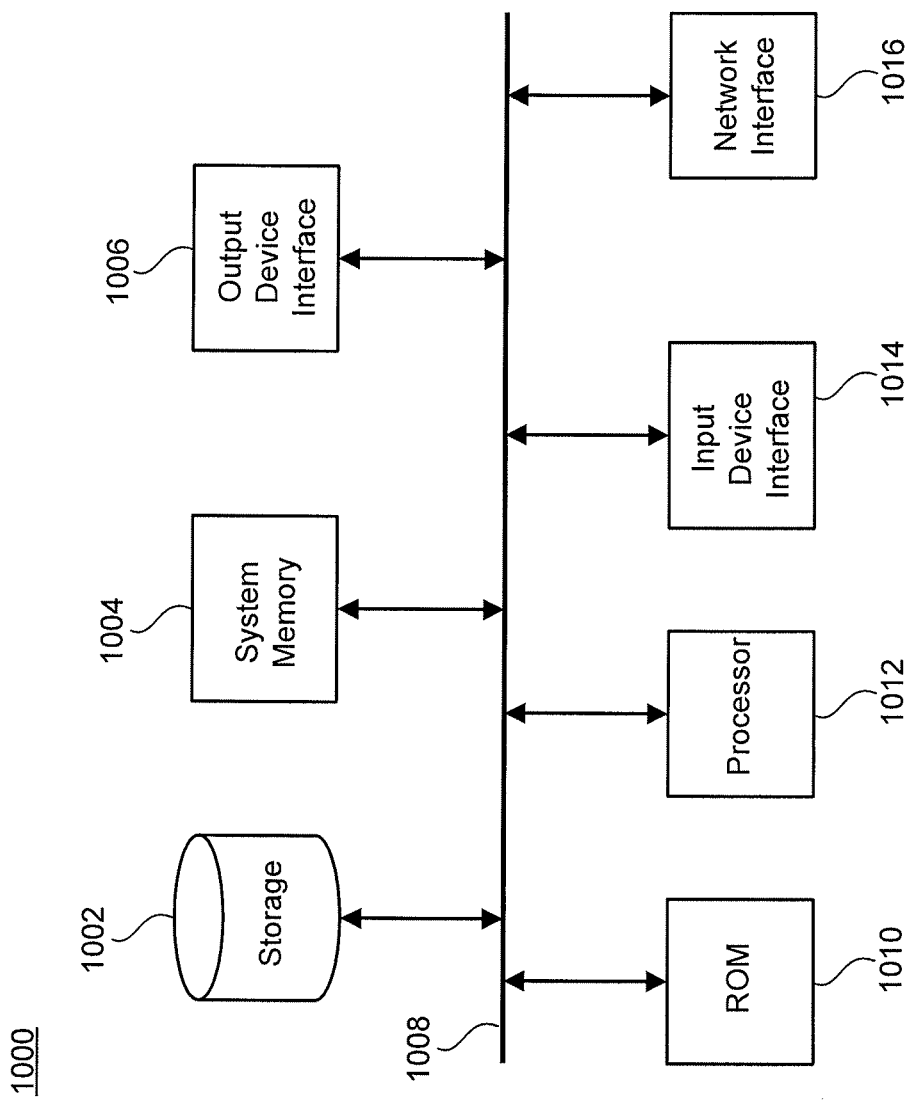
FIG. 10 conceptually illustrates an electronic system with which some implementations of the subject technology are implemented.

FIG. 10 conceptually illustrates an electronic system with which some implementations of the subject technology are implemented. Electronic system 1000 can be a computer, phone, PDA, or any other sort of electronic device. Such an electronic system includes various types of computer readable media and interfaces for various other types of computer readable media. Electronic system 1000 includes a bus 1008, processing unit(s) 1012, a system memory 1004, a read-only memory (ROM) 1010, a permanent storage device 1002, an input device interface 1014, an output device interface 1006 and a network interface 1016.

Bus 1008 collectively represents all system, peripheral and chipset buses that communicatively connect the numerous internal devices of electronic system 1000. For instance, bus 1008 communicatively connects processing unit(s) 1012 with ROM 1010, system memory 1004 and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002 and/or ROM 1010. For example, the various memory units include instructions for processing multimedia items in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interfaces 1006 enables, for example, the display of images generated by the electronic system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1008 also couples electronic system 1000 to a network (not shown) through a network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system may be interconnected by any form or medium of digital data communication, e.g., a communication network. While several components or steps are described as being performed by the system, it should be understood that various components and steps may be performed by different systems in communication with one another, e.g., through a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing a user with a user interface displaying a belonging-related stream of posts, the method comprising:

receiving an indication of a request from a first user of one or more users to view a user profile of the first user;

identifying belonging-related posts relating to the first user, the belonging-related posts including a first belonging-related post associated with a first belonging of a second user, a second belonging-related post associated with a second belonging of a third user, the first user being associated with the second user in a social graph of belongings and the first user being associated with the third user in a second social graph that is distinct from the social graph of belongings and that is maintained by a remote server, wherein the social graph of belongings comprises first associations between at least some of the one or more users and one or more belongings and second associations between at least some of the one or more users;

providing a user profile associated with the first user for display in response to receiving the indication, the user profile comprising:

a stream area for displaying only posts associated with one or more belongings of one or more users including the belonging-related posts relating to the first user, each of the respective belonging-related posts comprising a user link to a contact profile of a respective user associated with the respective belonging-related post and a belonging link to a belonging profile of a respective belonging associated with the respective belonging-related post;

providing the contact profile of the second user associated with the first belonging-related post of the belonging-related posts for display upon receiving the indication of a user selection of the user link of the first belonging-related post by the first user; and providing the belonging profile of the first belonging associated with the first belonging-related post for display upon receiving the indication of the user selection of the belonging link of the first belonging-related post by the first user.

2. The method of claim 1, wherein each of the one or more belongings in the social graph of belongings is associated with a belonging state that indicates whether each of the one or more belongings is borrowed, lent, or owned by each of the associated one or more users.

3. The method of claim 1, wherein the user profile of the first user further comprises a belonging area that displays the one or more belongings associated with the first user within the social graph of belongings.

4. The method of claim 1, wherein the contact profile comprises another stream area for displaying one or more additional belonging-related posts associated with the second user, each of the respective one or more additional belonging-related posts comprising another user link to another contact profile of another respective user associated with the respective belonging-related post and another belonging link to another belonging profile of another respective belonging associated with the respective belonging-related post.

5. The method of claim 4, further comprising:

receiving an indication of the user selection, by the first user, of the belonging link to the belonging profile of the first belonging associated with the first belonging-related post; and providing the belonging profile of the first belonging for display upon receiving the indication of the user selection of the belonging link by the first user.

6. The method of claim 4, wherein the contact profile further comprises another belonging area for displaying one or more belongings associated with the second user within the social graph of belongings.

7. The method of claim 1, wherein the belonging profile comprises another stream area for displaying one or more belonging-related posts associated with the first belonging, each of the respective one or more belonging-related posts associated with the first belonging comprising another user link to another contact profile of another respective user associated with the respective belonging-related post and another belonging link to another belonging profile of another respective belonging associated with the respective belonging-related post.

8. The method of claim 7, further comprising:
receiving an indication of the user selection, by the first user, of the user link to the contact profile of the second user associated with the first belonging-related post; and
providing the contact profile of the second user for display upon receiving the indication of the user selection of the user link by the first user.

9. The method of claim 7, wherein the belonging profile further comprises another belonging area for displaying information regarding the first belonging, wherein the information comprises a category of the first belonging.

10. The method of claim 1, wherein the stream area is further for displaying a comment associated with at least one of the belonging-related posts, wherein the comment comprises another user link to another user associated with the comment.

11. The method of claim 10, further comprising receiving an indication of a user selection of the another user link by the first user, wherein the another user associated with the comment is a contact of the first user; and
providing a contact profile associated with the contact for display upon receiving the indication of the user selection of the another user link by the first user.

12. A system for providing a user with a user interface displaying a belonging-related stream of belonging-related posts, the system comprising:
one or more processors; and
a machine-readable medium comprising instructions stored therein, which when executed by the processors, cause the processors to perform operations comprising:
providing a user profile associated with a first user of users of a system for display, the system maintaining a social graph of belongings, wherein the social graph of belongings defines first associations between at least some of the users and one or more belongings and second associations between at least some of the users, the user profile comprising:
a stream area for displaying one or more belonging-related posts relating to the first user, wherein the one or more belonging-related posts relating to the first user include a first belonging-related post associated with a first belonging of a second user of the users according to the first associations of the social graph of belongings, wherein the second user is associated with the first user according to the second associations of the social graph of belongings, and wherein each of the respective one or more belonging-related posts comprises a user link to a contact profile of a respective user of the one or more users that is associated with the respective belonging-related post and a belonging link to a belonging profile of a respective belonging of the one or more belongings that is associated with the respective belonging-related post, and a belonging area, separate from the stream area, for displaying, contemporaneously with the one or more belonging-related posts of the stream area, the one or more belongings associated with the first user; and
providing a belonging profile associated with the first belonging for display upon receiving an indication of a user selection, by the first user, of the belonging link of the first belonging-related post, wherein the belonging profile displays information regarding the first belonging, the information including a belonging category.

13. The system of claim 12, wherein the belonging profile comprises another stream area for displaying one or more belonging-related posts associated with the first belonging, each of the respective one or more belonging-related posts associated with the first belonging comprising another user link to another contact profile of another respective user associated with the respective belonging-related post and another belonging link to another profile of another respective belonging associated with the respective belonging-related post.

14. The system of claim 12, the operations further comprising: receiving an indication of a user selection, by the first user, of the user link to the second user associated with the first belonging-related post; and
providing a contact profile of the second user for display upon receiving the indication of the user selection of the user link by the first user.

15. The system of claim 14, wherein the contact profile comprises another stream area for displaying one or more belonging-related posts associated with the contact, each of the respective one or more belonging-related posts comprising another user link to another contact profile of another respective user associated with the respective belonging-related post and another belonging link to another belonging profile of another respective belonging associated with the respective belonging-related post.

16. A non-transitory machine-readable medium comprising instructions stored therein, which when executed by a machine, cause the machine to perform operations comprising:
identifying one or more belonging-related posts relating to a first user of users of a system, wherein the one or more belonging-related posts relating to the first user include one or more posts associated with a belonging of the first user according to one or more first associations between one or more belongings and at least some of the users in a social graph of belongings or a belonging of a second user of the users who is associated with the first user according to one or more second associations between the users in the social graph of belongings;
providing a user profile associated with the first user, the user profile comprising:
a stream area for displaying the one or more belonging-related posts, each of the respective one or more belonging-related posts comprising a user link to a contact profile of a respective user of the users that is associated with the respective belonging-related post and a belonging link to a belonging profile of a respective belonging of the one or more belongings that is associated with the respective belonging-related post; and
a belonging area, separate from the stream area, for displaying, contemporaneous with the one or more belonging-related posts, the one or more belongings associated with the first user based at least in part on the one or more first associations of the social graph of belongings.

17. The machine-readable medium of claim 16, the operations further comprising:
receiving an indication of a selection, by the user first, of the user link to the contact profile of the respective user associated with one of the one or more belonging-related posts;
providing the contact profile of the respective user associated with the one of the one or more belonging-related posts for display upon receiving the indication of the selection of the user link by the first user, wherein the respective user associated with the one of the one or more belonging-related posts is a contact of the first user; and
receiving an indication of a selection, by the first user, of the belonging link to the belonging profile of the respective belonging associated with another one of the one or more belonging-related posts; and
providing the belonging profile of the respective belonging associated with the another one of the one or more belonging-related posts for display upon receiving the indication of the selection of the belonging link by the first user.

18. The system of claim 12, wherein the one or more belonging-related posts include a second belonging-related post associated with a second belonging of a third user, the first user being associated with the third user in a social graph that is distinct from the social graph of belongings and that is maintained by a remote server.

19. The machine-readable medium of claim 16, wherein the one or more belonging-related posts include a first belonging-related post associated with the belonging of the second user and a second belonging-related post associated with another belonging of a third user, the first user being associated with the third user in a social graph that is distinct from the social graph of belongings and that is maintained by a remote server.

* * * * *